(12) United States Patent
Huh et al.

(10) Patent No.: US 12,321,057 B2
(45) Date of Patent: Jun. 3, 2025

(54) METHOD OF MANUFACTURING A DISPLAY DEVICE

(71) Applicant: SAMSUNG DISPLAY CO., LTD., Yongin-si (KR)

(72) Inventors: Su Jung Huh, Yongin-si (KR); Su Bin Jung, Yongin-si (KR)

(73) Assignee: SAMSUNG DISPLAY CO., LTD.

( * ) Notice: Subject to any disclaimer, the term of this patent is extended or adjusted under 35 U.S.C. 154(b) by 0 days.

(21) Appl. No.: 18/639,320

(22) Filed: Apr. 18, 2024

(65) Prior Publication Data

US 2025/0044628 A1 Feb. 6, 2025

(30) Foreign Application Priority Data

Jul. 31, 2023 (KR) ........................ 10-2023-0099671

(51) Int. Cl.
*G02F 1/1333* (2006.01)
*G02B 30/29* (2020.01)
*G02F 1/1335* (2006.01)
*G02F 1/13363* (2006.01)

(52) U.S. Cl.
CPC ....... *G02F 1/133354* (2021.01); *G02B 30/29* (2020.01); *G02F 1/133526* (2013.01); *G02F 1/133633* (2021.01)

(58) Field of Classification Search
CPC ......... G02F 1/133633; G02F 1/133526; G02F 1/133354
USPC .......................................................... 445/24
See application file for complete search history.

(56) References Cited

U.S. PATENT DOCUMENTS

| 8,134,779 | B2 | 3/2012 | Roh et al. |
| 8,634,034 | B2 | 1/2014 | Roh et al. |
| 9,327,488 | B2* | 5/2016 | Taniguchi ........... B41F 33/0081 |
| 9,869,877 | B2 | 1/2018 | Kim |
| 2003/0173033 | A1* | 9/2003 | Lee ..................... B32B 38/1841 |
| | | | 156/382 |
| 2008/0273159 | A1* | 11/2008 | Seok ..................... G02F 1/1347 |
| | | | 349/158 |
| 2018/0314075 | A1* | 11/2018 | Zhang ............... G02F 1/134309 |

FOREIGN PATENT DOCUMENTS

| JP | 2004233643 A | * | 8/2004 |
| KR | 10-0939214 | | 1/2010 |
| KR | 10-1279125 | | 6/2013 |
| KR | 10-2143373 | | 8/2020 |

* cited by examiner

*Primary Examiner* — Christopher M Raabe
(74) *Attorney, Agent, or Firm* — F. CHAU & ASSOCIATES, LLC

(57) ABSTRACT

A method of manufacturing a display device, the method including: forming a display panel including pixels; forming a first substrate on the display panel, wherein a polarization control layer is to be formed on the first substrate; aligning a first alignment mark of a second substrate with a first alignment mark of the first substrate, wherein a lens layer is to be formed on the second substrate; forming the second substrate on the first substrate; aligning a first alignment mark of a third substrate with the first alignment mark of the second substrate; and forming the third substrate on the second substrate.

20 Claims, 22 Drawing Sheets

☐ : SUB1_A1

▨ : SUB2_A1

☐ : SUB1_A1

▨ : SUB2_A1

▨ : SUB3_A1

METHOD OF MANUFACTURING A DISPLAY DEVICE

CROSS-REFERENCE TO RELATED APPLICATION

This application claims priority under 35 U.S.C. § 119 to Korean Patent Application No. 10-2023-0099671 filed in the Korean Intellectual Property Office on Jul. 31, 2023, the disclosure of which is incorporated by reference herein in its entirety.

(a) TECHNICAL FIELD

The present disclosure relates to a method of manufacturing a display device. More specifically, the present disclosure relates to a method of manufacturing a stereoscopic image display device that displays three-dimensional (3D) images.

(b) DESCRIPTION OF THE RELATED ART

A stereoscopic image display device is designed to engage the viewer's visual senses similar to how a real object would and provides physical factors that enable the perception of the object in three dimensions. For example, the stereoscopic image display device may provide different images to the left and right eyes of the viewer. This difference in images allows the viewer to experience a three-dimensional effect through binocular parallax between the left and right eyes.

Recently, there has been an increase in research on glasses-free techniques for viewing stereoscopic images. Among these, the lenticular method employs a cylindrical lens array to separate left-eye and right-eye images. Another approach, the barrier method, uses a barrier to separate left-eye and right-eye images.

SUMMARY

The present disclosure provides a method of manufacturing a display device that may form a polarization control layer and a lens layer through three substrates on a display panel.

An embodiment of the present disclosure provides a method of manufacturing a display device including: forming a display panel including pixels; forming a first substrate on the display panel, wherein a polarization control layer is to be formed on the first substrate; aligning a first alignment mark of a second substrate with a first alignment mark of the first substrate, wherein a lens layer is to be formed on the second substrate; forming the second substrate on the first substrate; aligning a first alignment mark of a third substrate with the first alignment mark of the second substrate; and forming the third substrate on the second substrate.

The first alignment mark of the first substrate is formed on an upper portion of the first substrate.

The first alignment mark of the second substrate is formed on a lower portion of the second substrate.

The first alignment mark of the third substrate is formed on a lower portion of the third substrate.

The aligning of the first alignment mark of the second substrate with the first alignment mark of the first substrate includes photographing the first alignment mark of the first substrate and the first alignment mark of the second substrate with a camera; and aligning the first alignment mark of the second substrate with the first alignment mark of the first substrate by moving the second substrate based on the photograph.

The aligning of the first alignment mark of the third substrate with the first alignment mark of the second substrate includes photographing the first alignment mark of the second substrate with a camera set to a first focus; photographing the first alignment mark of the third substrate with the camera set to a second focus different from the first focus; and aligning the first alignment mark of the third substrate with the first alignment mark of the second substrate by moving the third substrate based on the photographs.

The first alignment mark of the first substrate, the first alignment mark of the second substrate, and the first alignment mark of the third substrate are formed in a scribe line area.

The first alignment mark of the first substrate, the first alignment mark of the second substrate, and the first alignment mark of the third substrate are formed in an active area.

The first alignment mark of the first substrate, the first alignment mark of the second substrate, and the first alignment mark of the third substrate are formed in a scribe line area and an active area.

The method further includes aligning a (2-1)-th alignment mark of the second substrate with a second alignment mark of the first substrate.

A tolerance for the aligning of the first alignment mark of the first substrate and the first alignment mark of the second substrate is greater than a tolerance for the aligning of the second alignment mark of the first substrate and the (2-1)-th alignment mark of the second substrate.

The method further includes aligning a second alignment mark of the third substrate with a (2-2)-th alignment mark of the second substrate that is spaced apart from the (2-1)-th alignment mark of the second substrate.

A tolerance for the aligning of the first alignment mark of the second substrate and the first alignment mark of the third substrate is greater than a tolerance for the aligning of the (2-2)-th alignment mark of the second substrate and the second alignment mark of the third substrate.

An embodiment of the present disclosure provides a method of manufacturing a display device including: forming a display panel including pixels; forming a first substrate on the display panel, wherein a polarization control layer is to be formed on the first substrate; aligning a (2-1)-th alignment mark of a second substrate with a second alignment mark of the first substrate, wherein a lens layer is to be formed on the second substrate; forming the second substrate on the first substrate; aligning a second alignment mark of a third substrate with a (2-2)-th alignment mark of the second substrate that is spaced apart from the (2-1)-th alignment mark of the second substrate; and forming the third substrate on the second substrate.

The second alignment mark of the first substrate is formed on an upper portion of the first substrate, the (2-1)-th alignment mark and the (2-2)-th alignment mark of the second substrate are formed on a lower portion of the second substrate, and the second alignment mark of the third substrate is formed on a lower portion of the third substrate.

The aligning of the (2-1)-th alignment mark of the second substrate with the second alignment mark of the first substrate includes photographing the second alignment mark of the first substrate and the (2-1)-th alignment mark of the second substrate with a camera; and aligning the (2-1)-th alignment mark of the second substrate with the second alignment mark of the first substrate by moving the second substrate based on the photograph.

The aligning of the second alignment mark of the third substrate with the (2-2)-th alignment mark of the second substrate includes photographing the (2-2)-th alignment mark of the second substrate with a camera set to a first focus; photographing the second alignment mark of the third substrate with the camera set to a second focus different from the first focus; and aligning the second alignment mark of the third substrate with the (2-2)-th alignment mark of the second substrate by moving the third substrate based on the photographs.

The second alignment mark of the first substrate, the (2-1)-th alignment mark of the second substrate, the (2-2)-th alignment mark of the second substrate, and the second alignment mark of the third substrate are formed in a scribe line area.

The second alignment mark of the first substrate, the (2-1)-th alignment mark of the second substrate, the (2-2)-th alignment mark of the second substrate, and the second alignment mark of the third substrate are formed in an active area.

The second alignment mark of the first substrate, the (2-1)-th alignment mark of the second substrate, the (2-2)-th alignment mark of the second substrate, and the second alignment mark of the third substrate are formed in a scribe line area and an active area.

The method of manufacturing a display device according to embodiments of the present disclosure may perform an alignment process on first, second and third substrates by forming alignment marks for the first, second and third substrates at the same position.

The method of manufacturing the display device according to the embodiments of the present disclosure may perform an alignment process for first, second and third substrates by forming alignment marks for the first and second substrates at the same position and forming alignment marks for the second and third substrates at the same position.

The method of manufacturing the display device according to the embodiments of the present disclosure may form a polarization control layer and a lens layer through three substrates on a display panel. Accordingly, the manufacturing method of the display device omits an optical bonding process used to attach substrates between a lens array and a polarization control layer, thereby simplifying a manufacturing process and reducing manufacturing costs.

DETAILED DESCRIPTION OF THE EMBODIMENTS

Figure 1:
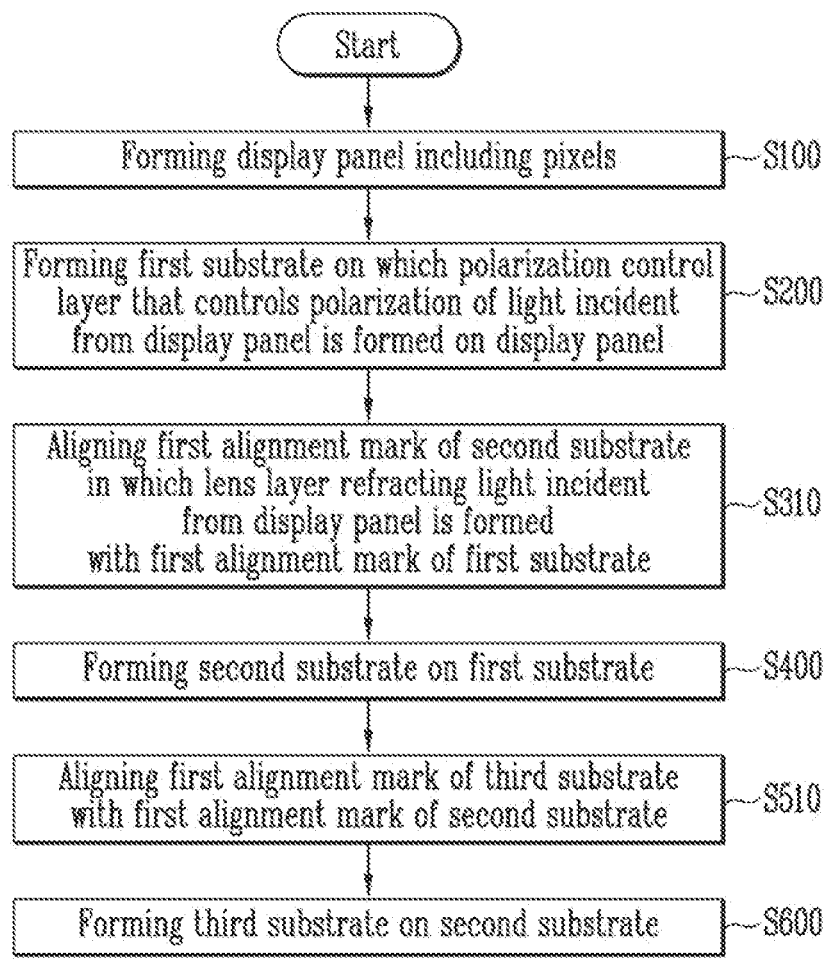
FIG. 1 illustrates a flowchart of a method of manufacturing a display device according to embodiments of the present disclosure.

Hereinafter, example embodiments of the present disclosure will be described in detail with reference to the accompanying drawings. It is to be understood, however, that the present disclosure may be embodied in different forms and is not limited to the embodiments set forth herein.

Throughout this specification, when it is described that an element is "connected" to another element, this includes not only being "directly connected", but also being "indirectly connected" with another device in between. The terms used herein are for the purpose of describing specific embodiments and are not intended to limit the scope of the disclosure. Throughout this specification, unless explicitly described to the contrary, the word "comprise" and variations such as "comprises" or "comprising" will be understood to imply the inclusion of stated elements but not the exclusion of any other elements. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms first, second, etc. may be used herein to describe various constituent elements, these constituent elements should not be limited by these terms. These terms are used to distinguish one constituent element from another constituent element. Thus, a first constituent element discussed below could be termed a second constituent element.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (for example, rotated 90 degrees or at other orientations), and, as such, the spatially relative descriptors used herein interpreted accordingly.

Various embodiments are described herein with reference to sectional illustrations that are schematic illustrations of idealized embodiments. As such, variations from the shapes of the illustrations as a result, for example, of manufacturing techniques and/or tolerances, are to be expected. Thus, example embodiments disclosed herein should not be construed as limited to the particular illustrated shapes of regions, but are to include deviations in shapes that result from, for instance, manufacturing. Thus, the regions illustrated in the drawings are schematic in nature and their shapes are not intended to illustrate the actual shape of a region of a device and are not intended to be limiting.

FIG. 1 illustrates a flowchart of a method of manufacturing a display device according to embodiments of the present disclosure.

Referring to FIG. 1, the method of manufacturing the display device in FIG. 1 may include forming a display panel including pixels (S100), forming a first substrate on which a polarization control layer that controls polarization of light incident from the display panel is formed on the display panel (S200), aligning a first alignment mark of a second substrate in which a lens layer refracting light incident from the display panel is formed with a first alignment mark of a first substrate (S310), forming the second substrate on the first substrate (S400), aligning a first alignment mark of a third substrate with the first alignment mark of the second substrate (S510), and forming the third substrate on the second substrate (S600). The method of manufacturing the display device shown in FIG. 1 is a method of manufacturing a stereoscopic image display device described with reference to FIG. 2 to FIG. 15.

Hereinafter, it will be described in detail with reference to FIG. 2 to FIG. 15.

Figure 2:
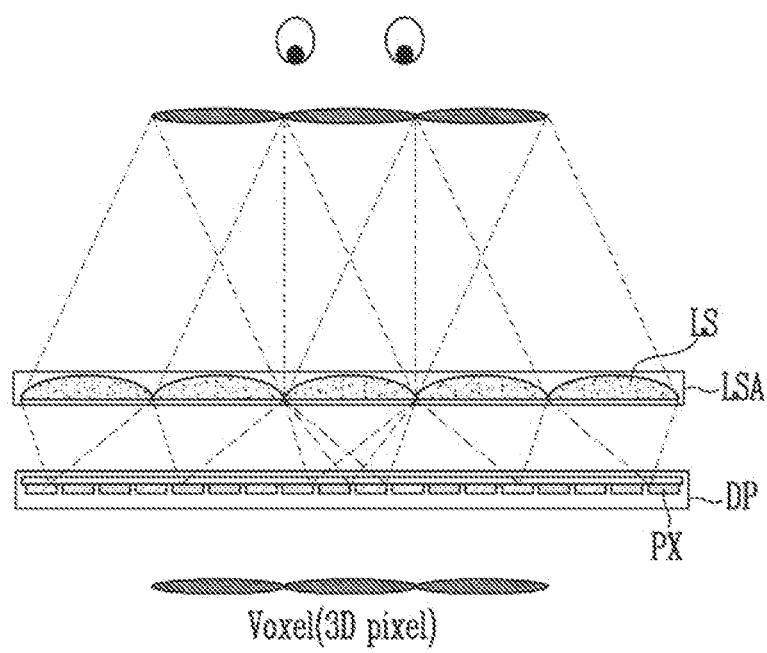
FIG. 2 illustrates a lens array type stereoscopic image display device.
Figure 3:
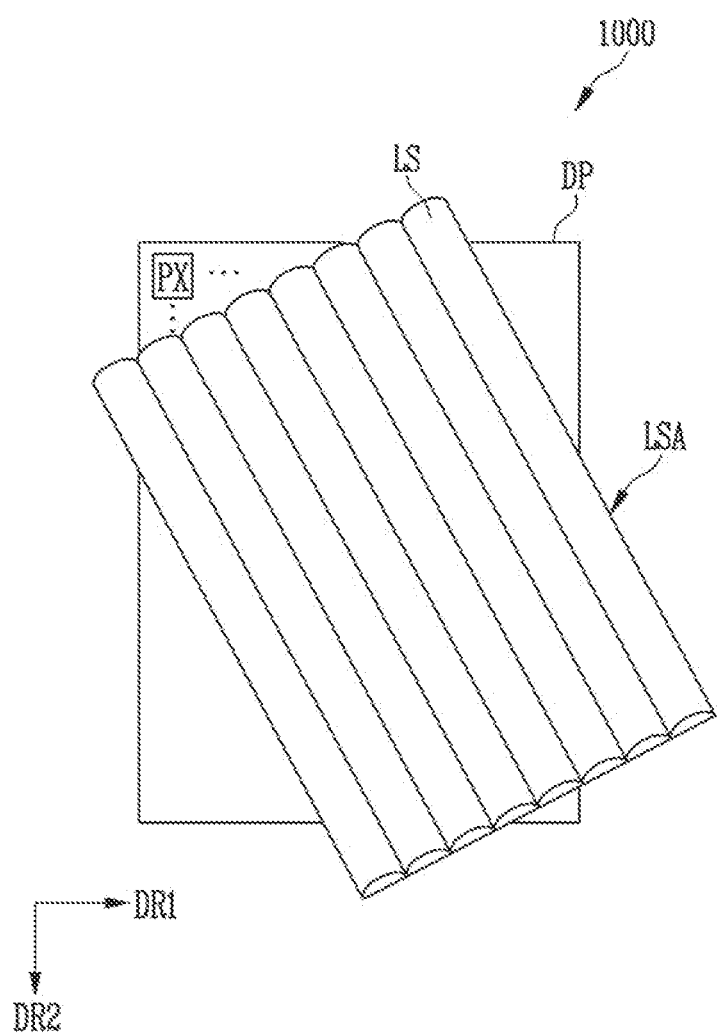
FIG. 3 schematically illustrates a stereoscopic image display device according to embodiments of the present disclosure.

FIG. 2 illustrates a lens array type stereoscopic image display device, and FIG. 3 schematically illustrates a stereoscopic image display device according to embodiments of the present disclosure.

Referring to FIG. 2 and FIG. 3, a stereoscopic image display device 1000 may include a display panel DP and a lens array LSA.

The display panel DP may include pixels PX that emit light to display an image. In the embodiment, each of the pixels PX may output one of red light, green light, and blue light. However, this is an example, and the color of light emitted from the pixels PX is not limited thereto, and light of various colors may be outputted for full-color implementation.

In the embodiment, the display panel DP may be connected to a driving circuit that drives the pixels PX. The driving circuit may perform at least one of functions of a gate driver, a data driver, and a driving controller. The driving circuit may also perform the function of an emission control driver. For example, the driving circuit may be disposed on a back surface of the display panel DP.

In the embodiment, the pixels PX may be disposed on a front surface of the display panel DP to form a light emitting surface. Images may be displayed through the pixels PX. The pixels PX may configure a plurality of pixel rows and a plurality of pixel columns. Here, the pixel rows may refer to a pixel group in which each pixel PX is connected to the same gate line, and the pixel columns may refer to a pixel group in which each pixel PX is connected to the same data line. For example, the pixel rows may be arranged in a second direction DR2, and the pixel columns may be arranged in a first direction DR1.

In the embodiment, the display panel DP may include a pixel circuit layer and a display element layer disposed on a predetermined substrate to configure the pixels PX. The display panel DP may further include an encapsulation structure that encapsulates the display element layer. Furthermore, the display panel DP may further include a polarization layer including a phase retarder and/or a polarizer on the encapsulation structure.

The pixel circuit layer may include a pixel circuit configured to drive a light emitting element of the pixel PX. For example, the pixel circuit layer may include transistors and signal lines/power lines connected to the transistors. The pixel circuit layer may have a stacked structure to form the transistors.

The display element layer may be disposed on the pixel circuit layer. The display element layer may include light emitting elements. The light emitting elements may be electrically connected to the pixel circuits of the pixel circuit layer. In the embodiment, the light emitting element may be a self-light emitting element. The self-light emitting element may include an organic light emitting element, an inorganic light emitting element, or a light emitting element configured of a combination of an inorganic material and an organic material. For example, the display panel DP may be a self-emitting display panel. However, this is an example, and the light emitting element may include a light emitting element (e.g., a quantum dot display element) that emits light by changing a wavelength of light emitted using quantum dots.

In addition, the display panel DP may be implemented as a liquid crystal display panel, a plasma display panel, or a display panel that displays images using quantum dots.

The lens array LSA may be disposed on the display panel DP, and may include lenses LS that refract light incident from the pixels PX. For example, the lens array LSA may be implemented as a lenticular lens array, a micro lens array, or the like.

A light field display is a three-dimensional (3D) display that uses a flat display and an optical element (for example, the lens array LSA) to realize a stereoscopic image by forming a light field expressed as a vector distribution (e.g., intensity, or direction) of light in space. The light field display is a display technology that can be used in various ways through combination with augmented reality (AR)

technology as it allows a depth and a side surface of an object to be viewed, enabling a more natural stereoscopic image.

The light field may be implemented in various ways. For example, a light field may be formed by a method to generate a light field in various directions using multiple projectors, a method of controlling a direction of light using diffraction grating, a method of controlling a direction and an intensity (e.g., brightness) of light according to a combination of each pixel using two or more panels, a method of controlling a direction of light using a pinhole or a barrier, and a method of controlling a direction of light refraction through a lens array.

In the embodiment, as shown in FIG. 3, the lens array type stereoscopic image display device 1000 may display a stereoscopic image (e.g., 3D image) by forming a light field.

A series of pixels PX may be assigned to each lens LS, and the light emitted from each pixel PX may be refracted by the lenses LS to proceed only in a specific direction to form a light field expressed in the intensity and direction of light. When a viewer views the stereoscopic image display device in the light field formed as described above, the viewer may feel a stereoscopic effect of a corresponding image.

Image information according to the viewpoint of the viewer in the light field may be processed in units of voxels. The voxel may be understood as graphic information defining a predetermined point (or pixel) of a 3D space.

In the embodiment, the lens array LSA may include semi-cylindrical lenses LS (for example, lenticular lenses) extending in one direction. For example, as shown in FIG. 3, the lenses LS may be arranged obliquely with respect to the first direction DR1 and extended. In other words, the lenses LS may be slantingly arranged. However, this is an example, and the extension direction (and arrangement direction) of the lenses LS is not limited thereto.

The size and arrangement of the lenses LS may be determined by conditions such as a size of a pixel area, a viewing distance, a pixel size, a resolution, and a pixel arrangement structure.

In the embodiment, the lens LS may include a micro lens rather than a lenticular lens. When viewed in a plan view, the micro lens may have a shape such as a hexagonal shape, a circular shape, or an elliptical shape.

Figure 4:
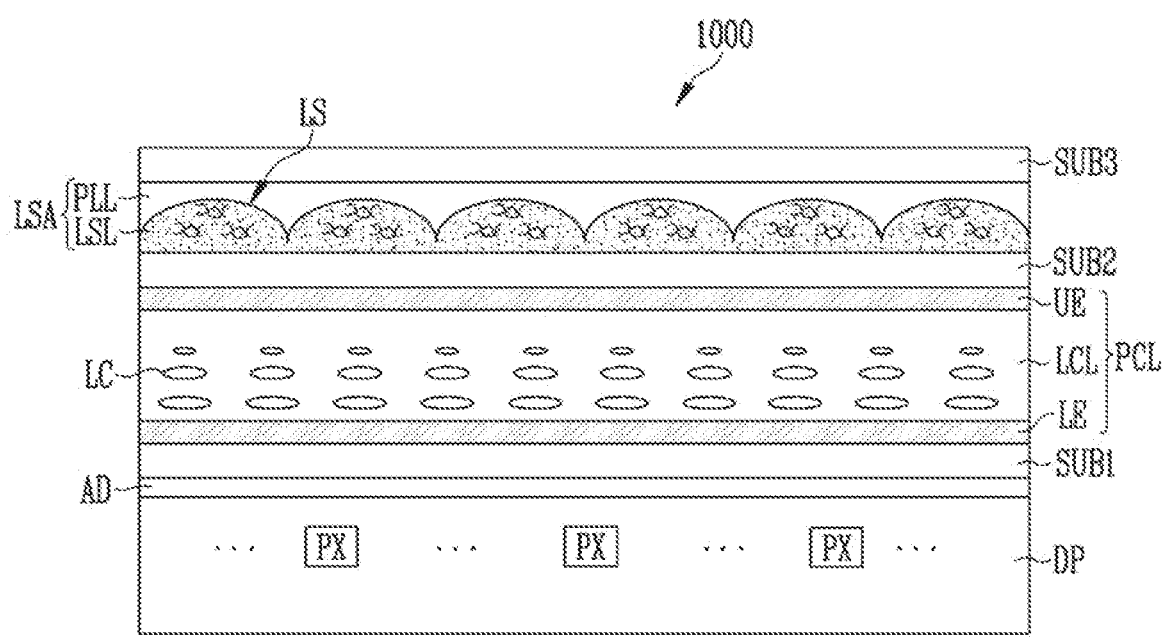
FIG. 4 illustrates a cross-sectional view of an example of a stereoscopic image display device.

FIG. 4 illustrates a cross-sectional view of an example of a stereoscopic image display device.

Referring to FIG. 2 to FIG. 4, a stereoscopic image display device 1000 may include a display panel DP, a polarization control layer PCL, and a lens array LSA.

The polarization control layer PCL may be disposed between the lens array LSA and the display panel DP. For example, polarization control layer PCL may be disposed between a lowermost portion of the lens array LSA and an uppermost portion of the display panel DP. The polarization control layer PCL may control polarization of light incident from the display panel DP.

The polarization control layer PCL may be formed on a first substrate SUB1. The polarization control layer PCL may include a lower electrode layer LE, a liquid crystal layer LCL, and an upper electrode layer UE.

The first substrate SUB1 may be disposed on the display panel DP. The first substrate SUB1 may be disposed on the display panel DP through optical bonding. In the embodiment, the first substrate SUB1 may be attached to the display panel DP through a transparent adhesive material AD. The transparent adhesive material AD may include an optically clear adhesive (OCA) or an optically clear resin (OCR).

The first substrate SUB1 may be made of a transparent insulating material. For example, the first substrate SUB1 may be an organic material selected from a group consisting of polyethersulphone (PES), polyacrylate (PAR), polyetherimide (PEI), polyethylene naphthalate (PEN), polyethylene terephthalate (PET), polyphenylene sulfide (PPS), polyarylate, polyimide, polycarbonate (PC), cellulose triacetate (SAC), and cellulose acetate propionate (CAP).

In the embodiment, the first substrate SUB1 may be an inorganic material. For example, the first substrate SUB1 may include a silicon nitride layer, a silicon oxynitride layer, a silicon oxide layer, a titanium oxide layer, or an aluminum oxide layer.

The lower electrode layer LE may be disposed on the first substrate SUB1. The lower electrode layer LE may include a transparent conductive material such as an ITO. A reference voltage that serves as a reference for turning on/off an operation of the liquid crystal layer LCL may be supplied to the lower electrode layer LE.

In the embodiment, at least one of a lower alignment film and a lower insulating layer covering the lower electrode layer LE may be further disposed on the lower electrode layer LE.

The upper electrode layer UE may be disposed to face the lower electrode layer LE. In other words, the upper electrode layer UE may be positioned opposite the lower electrode layer LE. The upper electrode layer UE may include a transparent conductive material such as an ITO. A driving voltage for turning on/off an operation of the liquid crystal layer LCL may be supplied to the upper electrode layer UE. Depending on whether the driving voltage is applied, an electric field may be formed between the upper electrode layer UE and the lower electrode layer LE, and an alignment direction of liquid crystal molecules LC included in the liquid crystal layer LCL may be controlled.

However, this is an example, and the driving voltage may be supplied to the lower electrode layer LE and the reference voltage may be supplied to the upper electrode layer UE.

In the embodiment, at least one of an upper alignment layer and an upper insulating layer may be further disposed between the upper electrode layer UE and the liquid crystal layer LCL.

The liquid crystal layer LCL may be disposed between the lower electrode layer LE and the upper electrode layer UE. The liquid crystal layer LCL may include liquid crystal molecules LC whose alignment direction is controlled according to a voltage applied to the upper electrode layer UE.

In the embodiment, the liquid crystal layer LCL may be driven in a twisted nematic (TN) liquid crystal mode with a N2 phase difference. However, this is an example, and the liquid crystal layer LCL may be driven in a liquid crystal mode such as vertical alignment (VA), optical compensated bend (OCB), or electrically controlled birefringence (ECB).

For example, in a state in which no electric field is applied to the liquid crystal molecules LC in the TN liquid crystal mode, the liquid crystal molecules LC are arranged (e.g., aligned) to rotate a linear polarization light in the vertical direction of incident light by 90° to change the linear polarization light in the vertical direction into linear polarized light in the horizontal direction. Accordingly, the liquid crystal layer LCL may linearly polarize the light incident from the display panel DP in the horizontal direction to transmit it. The light linearly polarized in the horizontal direction is provided to the lens array LSA, and an image may be displayed in a two-dimensional (2D) image mode.

On the other hand, in a stereoscopic image mode (or 3D image mode), a driving voltage is applied to the upper electrode layer UE, and an electric field may be formed between the upper electrode layer UE and the lower electrode layer LE. The liquid crystal molecules LC may be arranged (e.g., aligned) to transmit light incident by the formed electric field. For example, light with a polarization axis in the vertical direction incident from the display panel DP may be directly incident on the lens array LSA. Light refracted from the lens array LSA may divided into a path of light corresponding to a right-eye image and a path of light corresponding to a left-eye image, and may converge to different focal points to implement a stereoscopic image.

The lens array LSA may be formed on a second substrate SUB2. For example, the second substrate SUB2 may serve as a substrate (e.g., a mother substrate) for forming/manufacturing the lens array LSA. In the embodiment, the second substrate SUB2 may be made of a transparent insulating material. The second substrate SUB2 may include a transparent organic material or a transparent inorganic material that may configure the first substrate SUB1 described above. For example, the second substrate SUB2 may have the same material as the first substrate SUB1.

The lens array LSA may shape a light field by refracting light provided from the polarization control layer PCL. The lens array LSA may include a lens layer LSL and a planarization layer PLL. The planarization layer PLL may overlap the lens layer LSL. The lens array LSA may be directly disposed on the polarization control layer PCL without an intermediate medium.

In the embodiment, the lens layer LSL may be directly disposed on the upper electrode layer UE. For example, the material configuring the upper electrode layer UE may be directly deposited on a lower surface of the lens layer LSL.

In the embodiment, the lens layer LSL may include an array of lenses LS having a semi-cylindrical convex shape. For example, the lens LS may be a lenticular lens. However, this is an example, and the lens LS may be formed as a micro lens with each area having a micro size.

The lens layer LSL may include an optically anisotropic material. For example, the inside of the lens layer LSL may be made of reactive mesogen. In other words, the lens layer LSL has a mesogenic structure, so the lens layer LSL may form a liquid crystal phase.

The material filling the lens layer LSL may be cured by reacting with light such as ultraviolet rays to form the liquid crystalline phase. Accordingly, the inside of the lens layer LSL may have an optically anisotropic fixed phase. For example, the lens layer LSL may have a long axis refractive index and a short axis refractive index that are different.

The planarization layer PLL may cover the lens layer LSL. The planarization layer PLL may be in direct contact with the lens layer LSL. The planarization layer PLL has a substantially flat upper surface, and may be made of an optically isotropic polymer.

For example, the planarization layer PLL may include an optically isotropic material having a refractive index substantially equivalent to the long axis refractive index or short axis refractive index of the lens layer LSL.

When the light incident from the polarization control layer PCL vibrates along an axis direction with a different refractive index from the planarization layer PLL, this light may be refracted and emitted, based on a difference in refractive index between the lens layer LSL and the planarization layer PLL, at an interface therebetween. In this case, a stereoscopic image may be displayed by the refraction of the emitted light.

When the light incident from the polarization control layer PCL vibrates along an axis direction with the same refractive index as the lens layer LSL and the planarization layer PLL, the incident light may be emitted as is (e.g., without alteration) in the direction of the vibration of the incident light.

In this way, a 3D image may be implemented by the relationship between the direction of vibration of incident light provided to the lens array LSA and the refractive index of the lens layer LSL and planarization layer PLL.

In the embodiment, a third substrate SUB3 may be disposed on the planarization layer PLL. For example, the third substrate SUB3 may protect the lens array LSA disposed thereunder from external contamination, impact, and scratches.

In the embodiment, the third substrate SUB3 may be made of a transparent insulating material. The third substrate SUB3 may include a transparent organic material or a transparent inorganic material that may configure the first substrate SUB1 described above. For example, the third substrate SUB3 may have the same material as the first substrate SUB1.

In the embodiment, the lens array LSA including the lens layer LSL having the photo-cured reactive mesogen and the planarization layer PLL and the third substrate SUB3 may be provided in the form of a film.

In contrast, when the lens layer LSL is configured using a fluid liquid crystal polymer, the liquid crystal polymer may flow outside the lens LS, and to prevent this, an additional substrate (or an additional base layer) is interposed between the lens layer LSL and the upper electrode layer UE. The fluid liquid crystal polymer of the lens layer LSL may be aligned according to the electric field formed in the lens layer LSL. This lens array may be understood as a liquid crystal lens array. The liquid crystal lens array may have reliability issue such as crystallization of liquid crystals under low temperature conditions.

In addition, in a stereoscopic image display device having the liquid crystal lens array, a thickness of the lens array LSA increases due to additional substrates, and thus a focal length, which is a distance from the pixel PX to the lens LS, increases.

The focal distance is a major factor that determines optical characteristics such as a viewing angle of a stereoscopic image. For example, as the focal distance decreases, the viewing angle increases, which can increase the image quality of the stereoscopic image. Particularly, the viewing angle may be increased by a decrease in the focal length according to a decrease in the thickness of the lens array LSA.

In the embodiment, the polarization control layer PCL may be formed on the first substrate SUB1, the second substrate SUB2 may be formed on the polarization control layer PCL, the lens array LSA may be formed on the second substrate SUB2, and the third substrate SUB3 may be formed on the lens array LSA. For example, the first substrate SUB1, the polarization control layer PCL, the second substrate SUB2, the lens array LSA, and the third substrate SUB3 may be arranged in sequence. In the embodiment, the second substrate SUB2 on which the lens array LSA is formed may be formed on the polarization control layer PCL.

The method of manufacturing a display device according to embodiments of the present invention may reduce the number of optical bonding and scribe line cutting compared to a case of forming the polarization control layer PCL between two substrates, forming the lens array LSA between the two substrates, and then bonding the substrates. In other words, the manufacturing method of the display device omits an optical bonding process of attaching the substrates between the lens array LSA and the polarization control layer PCL, thereby simplifying the manufacturing process and reducing manufacturing costs.

Figure 5:
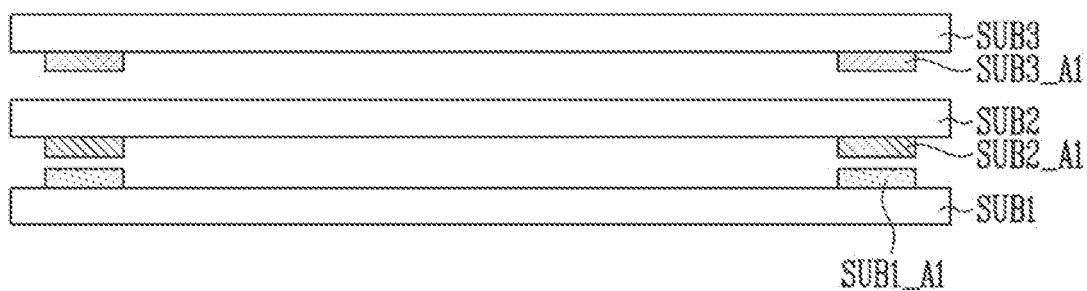
FIG. 5 illustrates an example of a first alignment mark according to the method of manufacturing the display device of FIG. 1.
Figure 6:
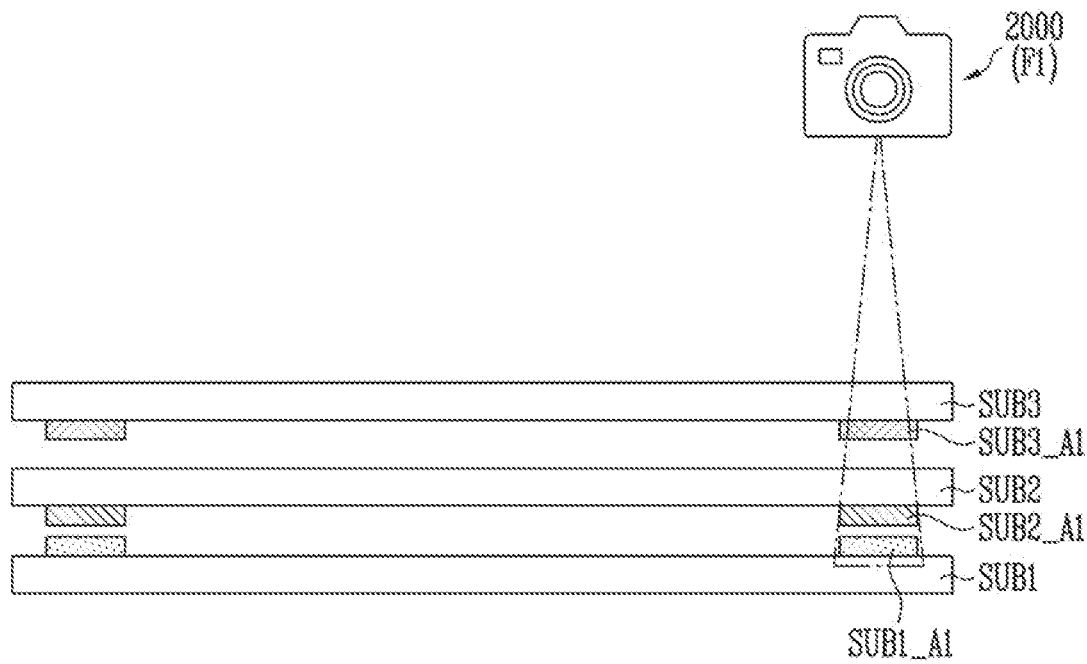
FIG. 6 illustrates an example in which a camera device photographs a first alignment mark of a first substrate and a first alignment mark of a second substrate.
Figure 7:
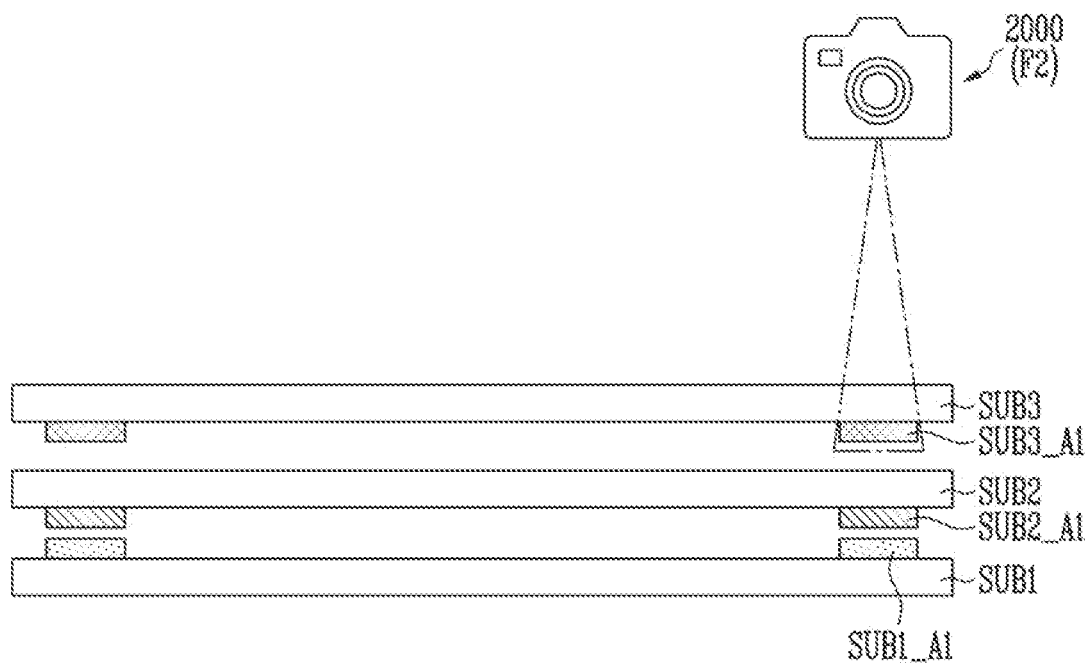
FIG. 7 illustrates an example in which a camera device photographs a first alignment mark of a third substrate.
Figure 8:
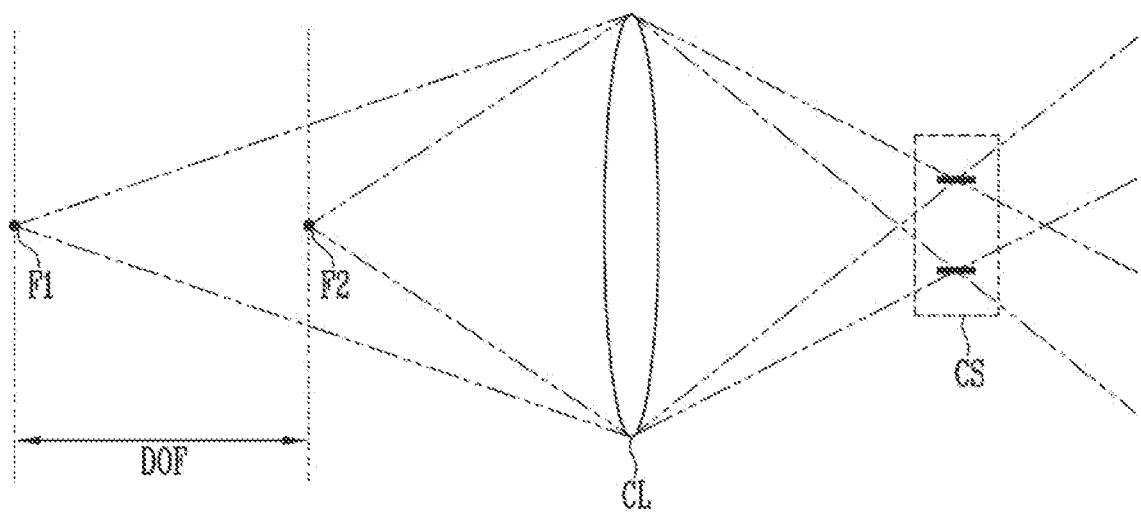
FIG. 8 illustrates a first focus and a second focus of a camera device.

FIG. 5 illustrates an example of a first alignment mark according to the method of manufacturing the display device of FIG. 1, FIG. 6 illustrates an example in which a camera device photographs a first alignment mark of a first substrate and a first alignment mark of a second substrate, FIG. 7 illustrates an example in which a camera device photographs a first alignment mark of a third substrate, and FIG. 8 illustrates a first focus and a second focus of a camera device.

FIG. 5 to FIG. 7 show for ease of understanding and description, that alignment marks SUB1_A1, SUB2_A1, and SUB3_A1 of each substrate overlap, but as shown in FIG. 9 to FIG. 12, the alignment marks SUB1_A1, SUB2_A1, and SUB3_A1 may not overlap.

Referring to FIG. 5, before forming substrates, it is necessary to dispose the substrates in a correct position. Accordingly, alignment marks may be formed on each substrate to ensure that the substrates are disposed in the correct position. Producers may check whether each substrate is disposed in the correct position by checking whether the alignment mark of each substrate is aligned with the alignment mark of another substrate. A detailed description of this will be described later.

The first alignment mark SUB1_A1 of the first substrate SUB1, the first alignment mark SUB2_A1 of the second substrate SUB2, and the first alignment mark SUB3_A1 of the third substrate SUB3 may be formed at the same position. For example, the first alignment mark SUB3_A1 of the third substrate SUB3 may be aligned with the first alignment mark SUB2_A1 of the second substrate SUB2, which is aligned with the first alignment mark SUB1_A1 of the first substrate SUB1. For example, the first alignment mark SUB1_A1 of the first substrate SUB1, the first alignment mark SUB2_A1 of the second substrate SUB2, and the first alignment mark SUB3_A1 of the third substrate SUB3 may overlap each other in the vertical direction.

The first alignment mark SUB1_A1 of the first substrate SUB1 may be formed on an upper portion of the first substrate SUB1. The first alignment mark SUB2_A1 of the second substrate SUB2 may be formed on a lower portion of the second substrate SUB2. This configuration permits the first alignment mark SUB1_A1 of the first substrate SUB1 to be in close proximity to the first alignment mark SUB2_A1 of the second substrate SUB2. The first alignment mark SUB3_A1 of the third substrate SUB3 may be formed on a lower portion of the third substrate SUB3.

In this way, the method of manufacturing the display device may form the second substrate SUB2 in a more accurate position by forming the first alignment mark SUB1_A1 of the first substrate SUB1 and the first alignment mark SUB2_A1 of the second substrate SUB2 as close as possible.

However, the present disclosure is not limited thereto. For example, the first alignment mark SUB1_A1 of the first substrate SUB1 may be formed on a lower portion of the first substrate SUB1. For example, the first alignment mark SUB2_A1 of the second substrate SUB2 may be formed on an upper portion of the second substrate SUB2. For example, the first alignment mark SUB3_1 of the third substrate SUB3 may be formed on an upper portion of the third substrate SUB3.

Referring to FIG. 6 to FIG. 8, the method of manufacturing the display device may check whether the first alignment marks SUB1_A1, SUB2_A1, and SUB3_A1 are aligned through a camera device 2000. A detailed description of whether the alignment is performed will be described later.

In the manufacturing method of the display device, the first alignment mark SUB1_A1 of the first substrate SUB1 and the first alignment mark SUB2_A1 of the second substrate SUB2 may photographed with the camera device 2000, and the second substrate SUB2 may be moved to align the first alignment mark SUB2_A1 of the second substrate SUB2 with the first alignment mark SUB1_A1 of the first substrate SUB1. In the manufacturing method of the display device, the first alignment mark SUB2_A1 of the second substrate SUB2 and the first alignment mark SUB3_A1 of the third substrate SUB3 may photographed with the camera device 2000, and the third substrate SUB3 may be moved to align the first alignment mark SUB3_A1 of the third substrate SUB3 with the first alignment mark SUB2_A1 of the second substrate SUB2.

For example, the first alignment mark SUB1_A1 of the first substrate SUB1 and the first alignment mark SUB2_A1 of the second substrate SUB2 may be photographed with the camera device 2000 set to a first focus F1, as shown in FIG. 6. For example, the first alignment mark SUB3_A1 of the third substrate SUB3 may be photographed with the camera device 2000 set to a second focus F2 that is different from the first focus F1, as shown in FIG. 7.

The camera device 2000 may include a camera lens CL and a camera sensor CS. The camera lens CL may refract light incident on the camera device 2000 to provide the incident light to the camera sensor CS. The camera sensor CS may receive the incident light to provide images to a user.

As shown in FIG. 8, a depth of field DOF of the camera device 2000 may include the first focus F1 and the second focus F2. For example, the depth of field DOF may be a range in which an image quality desired by the user is maintained when a position of an object moves closer or further away.

Figure 9:
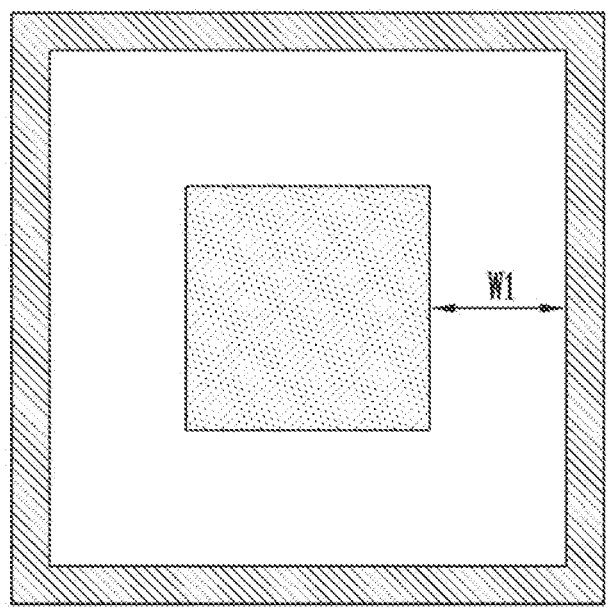
FIG. 9 and FIG. 10 illustrate examples of aligning the first alignment mark of the first substrate and the first alignment mark of the second substrate in FIG. 5.
Figure 10:
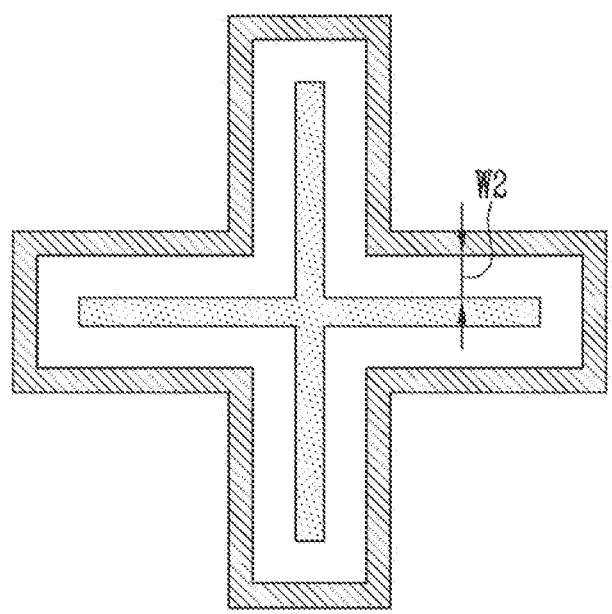
Figure 11:
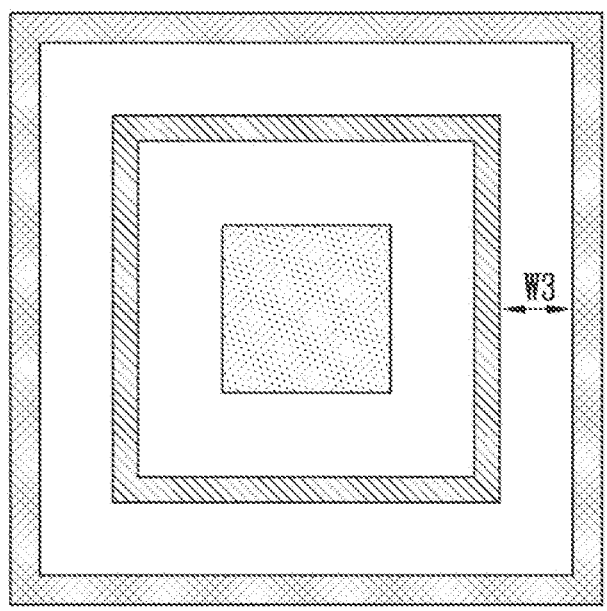
FIG. 11 and FIG. 12 illustrate examples of aligning the first alignment mark of the second substrate and the first alignment mark of the third substrate in FIG. 5.
Figure 12:
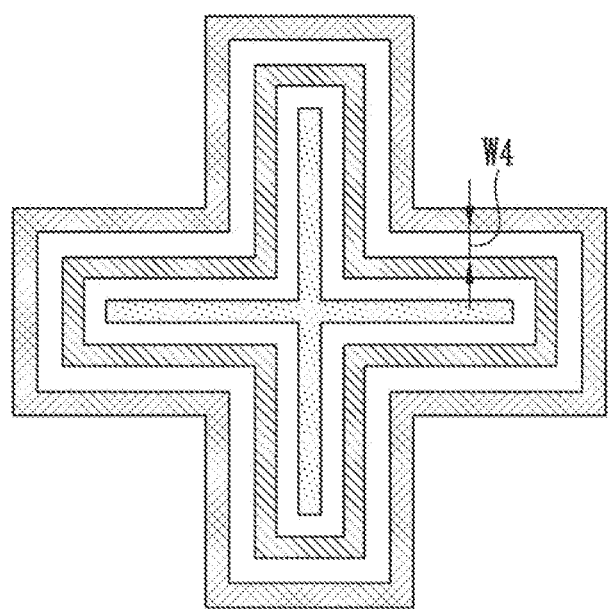

FIG. 9 and FIG. 10 illustrate examples of aligning the first alignment mark of the first substrate and the first alignment mark of the second substrate in FIG. 5, and FIG. 11 and FIG. 12 illustrate examples of aligning the first alignment mark of the second substrate and the first alignment mark of the third substrate in FIG. 5.

Referring to FIG. 9 to FIG. 12, the alignment of the alignment marks may be determined in a preset manner.

In the embodiment, according to the method of manufacturing the display device, the first alignment mark SUB1_A1 of the first substrate SUB1 may be included in the first alignment mark SUB2_A1 of the second substrate SUB2, so that the first alignment mark SUB2_A1 of the second substrate SUB2 may be aligned to the first alignment mark SUB1_A1 of the first substrate SUB1.

For example, as shown in FIG. 9, the first alignment mark SUB1_A1 of the first substrate SUB1 and the first alignment mark SUB2_A1 of the second substrate SUB2 may have a quadrangular shape. In the configuration of FIG. 9, the first alignment mark SUB1_A1 of the first substrate SUB1 may be enclosed by the first alignment mark SUB2_A1 of the second substrate SUB2. For example, as shown in FIG. 10, the first alignment mark SUB1_A1 of the first substrate SUB1 and the first alignment mark SUB2_A1 of the second substrate SUB2 may have a cross shape. In the configuration of FIG. 10, the first alignment mark SUB1_A1 of the first substrate SUB1 may be enclosed by the first alignment mark SUB2_A1 of the second substrate SUB2.

The maximum width (e.g., a second width W2) that may be formed when the first alignment mark SUB1_A1 of the first substrate SUB1 and the first alignment mark SUB2_A1 of the second substrate SUB2 in FIG. 10 are aligned may be smaller than the maximum width (e.g., a first width W1) that may be formed when the first alignment mark SUB1_A1 of the first substrate SUB1 and the first alignment mark SUB2_A1 of the second substrate SUB2 in FIG. 9 are aligned. For example, the alignment according to FIG. 9 may have a larger margin for alignment than the alignment according to FIG. 10. In other words, it may be easier to align the alignment marks configured as shown in FIG. 9. Accordingly, the tolerance for the alignment of the first alignment mark SUB1_A1 of the first substrate SUB1 and the first alignment mark SUB2_A1 of the second substrate SUB2 according to FIG. 9 may be greater than the tolerance for the alignment of the first alignment mark SUB1_A1 of the first substrate SUB1 and the first alignment mark SUB2_A1 of the second substrate SUB2 according to FIG. 10. Therefore, the alignment marks according to FIG. 10 may be more suitable for fine adjustment than the alignment marks according to FIG. 9. Here, the tolerance may be an allowable error in the position of the substrate set by the designer.

In the embodiment, according to the method of manufacturing the display device, the first alignment mark SUB2_A1 of the second substrate SUB2 may be included in the first alignment mark SUB3_A1 of the third substrate SUB3, so that the first alignment mark SUB3_A1 of the third substrate SUB3 may be aligned to the first alignment mark SUB2_A1 of the second substrate SUB2.

For example, as shown in FIG. 11, the first alignment mark SUB2_A1 of the second substrate SUB2 and the first alignment mark SUB3_A1 of the third substrate SUB3 may have a quadrangular shape. In the configuration of FIG. 11, the first alignment mark SUB2_A1 of the second substrate SUB2 may be enclosed by the first alignment mark SUB3_A1 of the third substrate SUB3. For example, as shown in FIG. 12, the first alignment mark SUB2_A1 of the second substrate SUB2 and the first alignment mark SUB3_A1 of the third substrate SUB3 may have a cross shape. In the configuration of FIG. 12, the first alignment mark SUB2_A1 of the second substrate SUB2 may be enclosed by the first alignment mark SUB3_A1 of the third substrate SUB3.

The maximum width (e.g., a fourth width W4) that may be formed when the first alignment mark SUB2_A1 of the second substrate SUB2 and the first alignment mark SUB3_A1 of the third substrate SUB3 in FIG. 12 are aligned may be smaller than the maximum width (e.g., a third width W3) that may be formed when the first alignment mark SUB2_A1 of the second substrate SUB2 and the first alignment mark SUB3_A1 of the third substrate SUB3 in FIG. 11 are aligned. For example, the alignment according to FIG. 11 may have a larger margin for alignment than the alignment according to FIG. 12. In other words, it may be easier to align the alignment marks configured as shown in FIG. 11. Accordingly, the tolerance for the alignment of the first alignment mark SUB2_A1 of the second substrate SUB2 and the first alignment mark SUB3_A1 of the third substrate SUB3 according to FIG. 11 may be greater than the tolerance for the alignment of the first alignment mark SUB2_A1 of the second substrate SUB2 and the first alignment mark SUB3_A1 of the third substrate SUB3 according to FIG. 12. Therefore, the alignment marks according to FIG. 12 may be more suitable for fine adjustment than the alignment marks according to FIG. 11.

However, the present disclosure is not limited to the shape and alignment method of the alignment mark.

Figure 13:
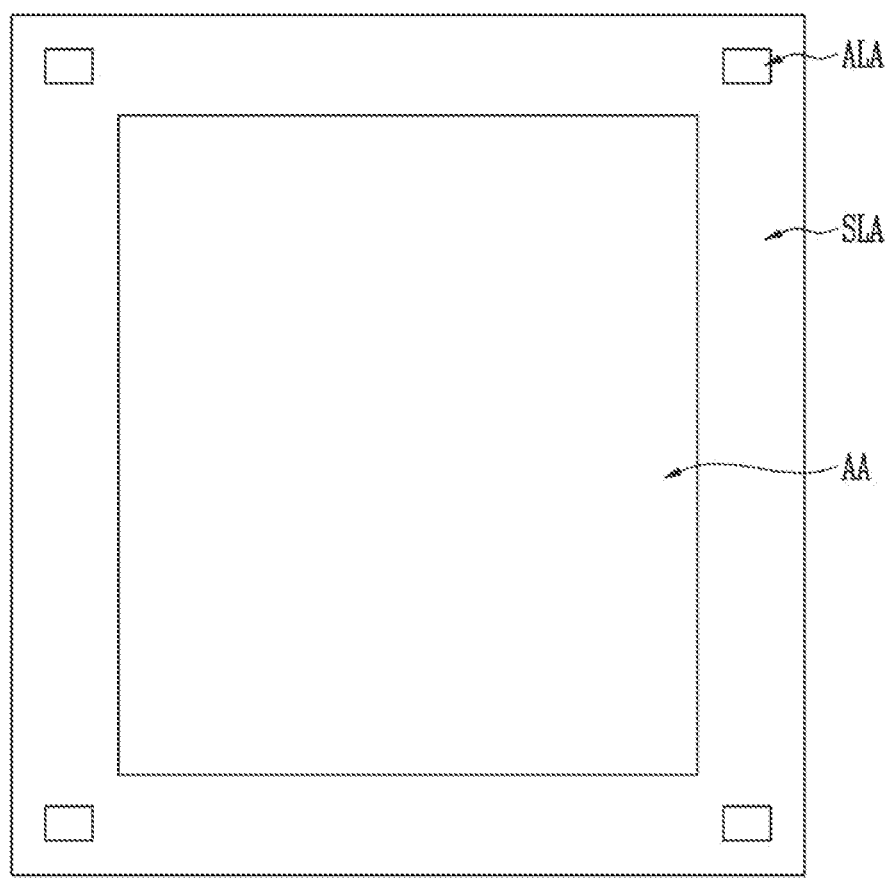
FIG. 13, FIG. 14 and FIG. 15 illustrate examples of positions of alignment marks according to the method of manufacturing the display device of FIG. 1.
Figure 14:
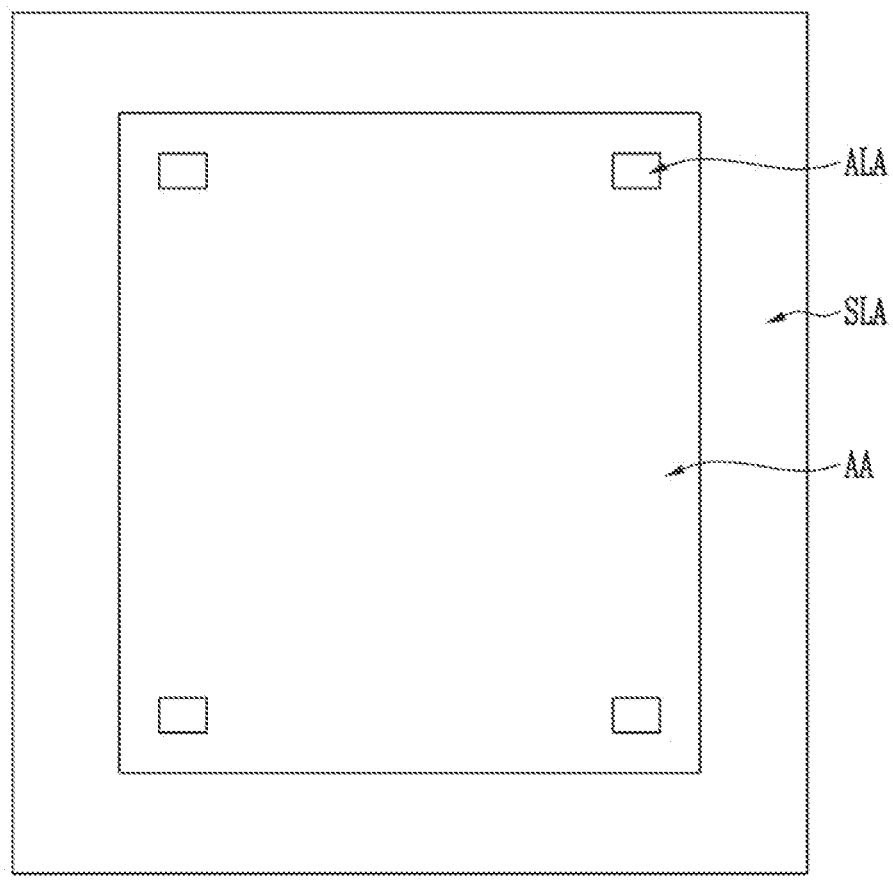
Figure 15:
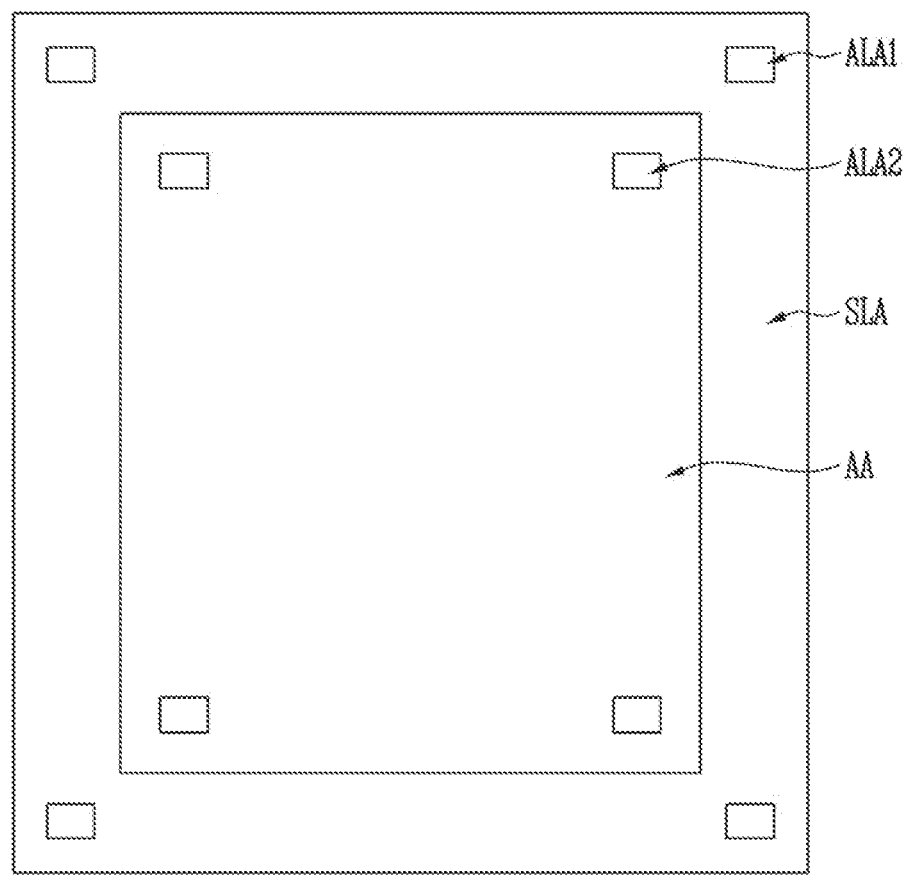

FIG. 13 to FIG. 15 illustrate examples of positions of alignment marks according to the method of manufacturing the display device of FIG. 1.

Referring to FIG. 5 and FIG. 13, in the embodiment, an alignment area ALA in which the first alignment mark SUB1_A1 of the first substrate SUB1, the first alignment mark SUB2_A1 of the second substrate SUB2, and the first alignment mark SUB3_A1 of the third substrate SUB3 are formed may be included in a scribe line area SLA.

Referring to FIG. 5 and FIG. 14, in the embodiment, an alignment area ALA in which the first alignment mark SUB1_A1 of the first substrate SUB1, the first alignment mark SUB2_A1 of the second substrate SUB2, and the first alignment mark SUB3_A1 of the third substrate SUB3 are formed may be included in an active area AA.

Referring to FIG. 5 and FIG. 15, in the embodiment, an alignment area ALA1 in which the first alignment mark SUB1_A1 of the first substrate SUB1, the first alignment mark SUB2_A1 of the second substrate SUB2, and the first alignment mark SUB3_A1 of the third substrate SUB3 are formed may be included in the scribe line area SLA, and an alignment area ALA2 in which the first alignment mark SUB1_A1 of the first substrate SUB1, the first alignment mark SUB2_A1 of the second substrate SUB2, and the first alignment mark SUB3_A1 of the third substrate SUB3 are formed may be included in the active area AA.

Here, the scribe line area SLA is an area outside the scribe line and is an area removed during the manufacturing process. For example, the display device may include only the active area AA in which the scribe line area SLA is removed from the first substrate SUB1, the second substrate SUB2, and the third substrate SUB3. For example, after the first, second and third substrates SUB1, SUB2, and SUB3 are formed, the scribe line area SLA of each of the first, second and third substrates SUB1, SUB2, and SUB3 may be removed.

Figure 16:
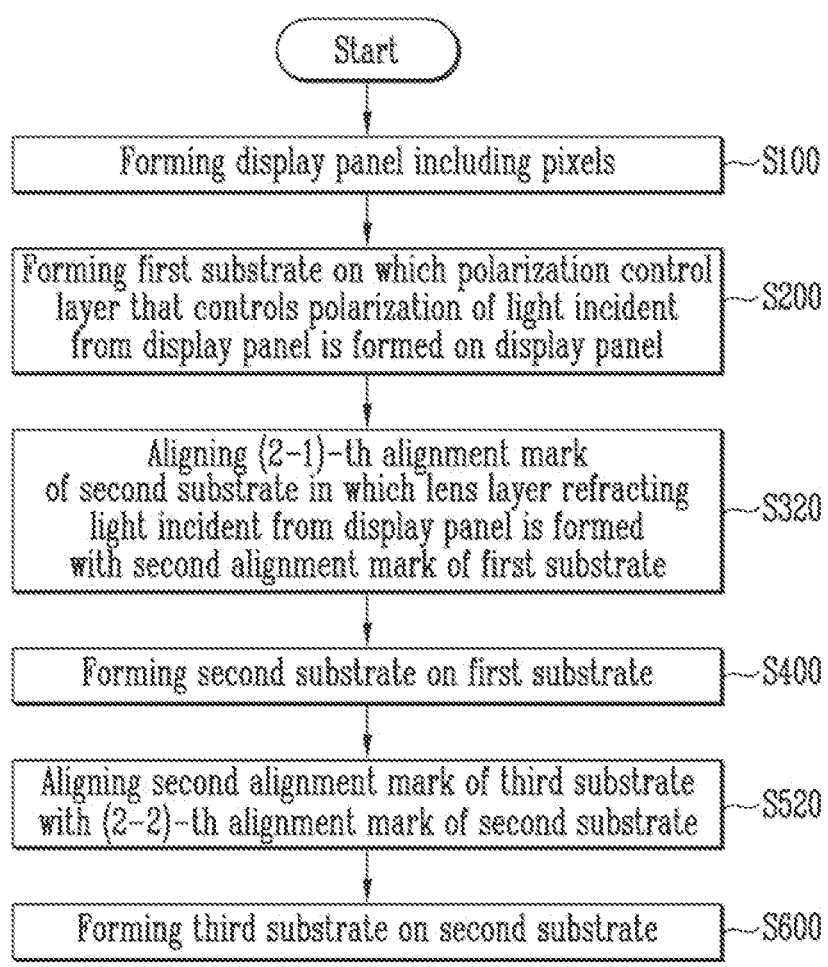
FIG. 16 illustrates a flowchart of a method of manufacturing a display device according to embodiments of the present disclosure.

FIG. 16 illustrates a flowchart of a method of manufacturing a display device according to embodiments of the present disclosure.

Since the method of manufacturing the display device according to the present embodiment is substantially the same as the method of manufacturing the display device of FIG. 1, except for the alignment mark, the same reference numerals and reference symbols are used for the same or similar constituent elements, and redundant descriptions are omitted.

Referring to FIG. 16, the method of manufacturing the display device in FIG. 16 may include forming a display panel including pixels (S100), forming a first substrate on which a polarization control layer that controls polarization of light incident from the display panel is formed on the display panel (S200), aligning a (2-1)-th alignment mark of a second substrate in which a lens layer refracting light incident from the display panel is formed with a second alignment mark of a first substrate (S320), forming the second substrate on the first substrate (S400), aligning a second alignment mark of a third substrate with a (2-2)-th alignment mark of the second substrate (S520), and forming the third substrate on the second substrate (S600).

Hereinafter, the method of FIG. 16 will be described in detail with reference to FIG. 17 to FIG. 24.

Figure 17:
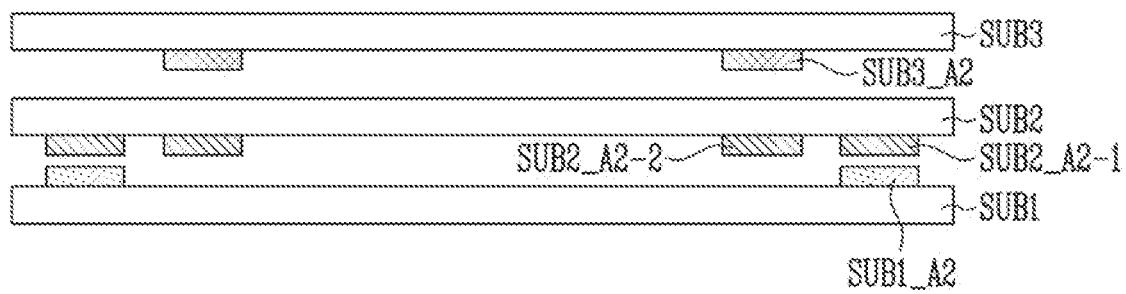
FIG. 17 illustrates an example of a second alignment mark according to the method of manufacturing the display device of FIG. 16.
Figure 18:
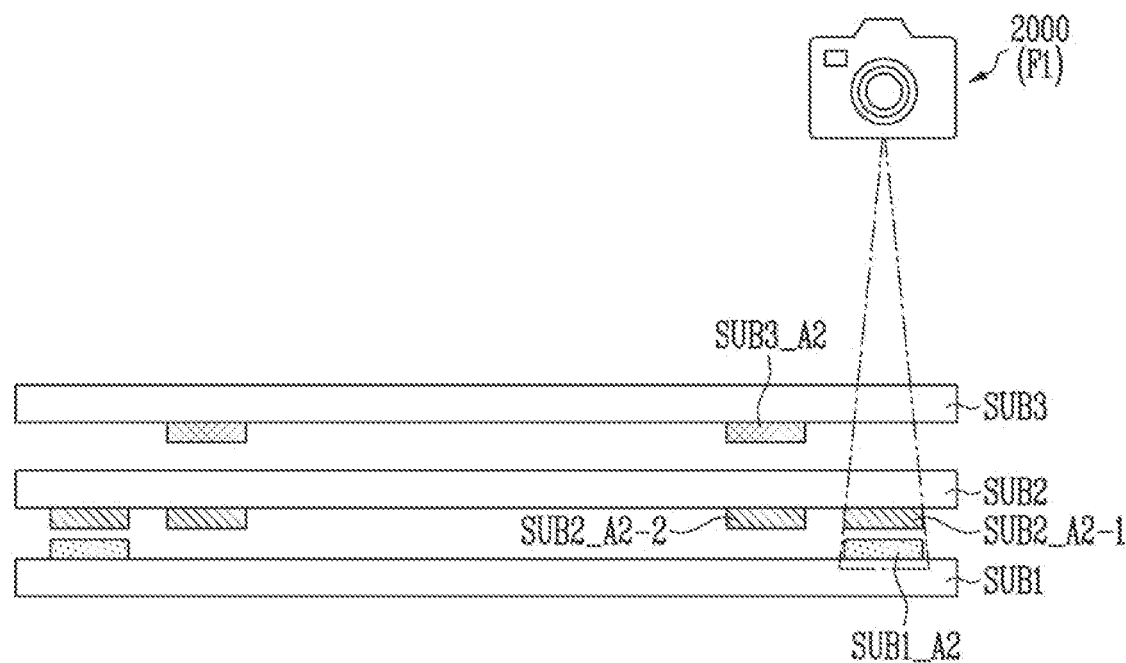
FIG. 18 illustrates an example in which a camera device photographs a second alignment mark of a first substrate and a (2-1)-th alignment mark of a second substrate.
Figure 19:
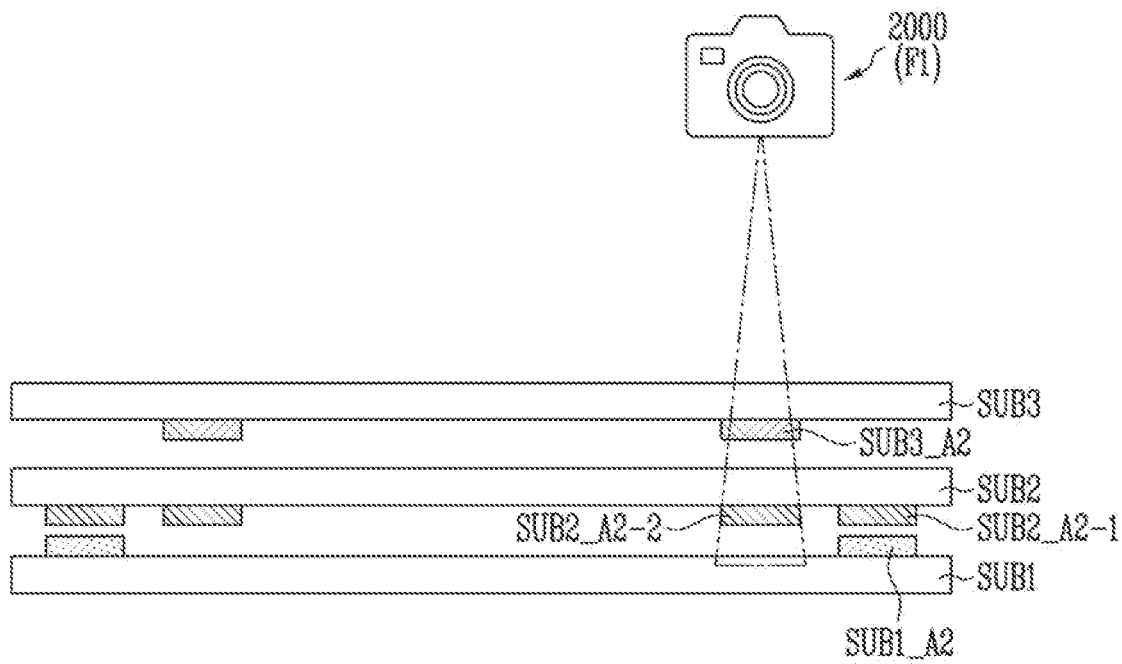
FIG. 19 illustrates an example in which a camera device photographs a (2-2)-th alignment mark of a second substrate.
Figure 20:
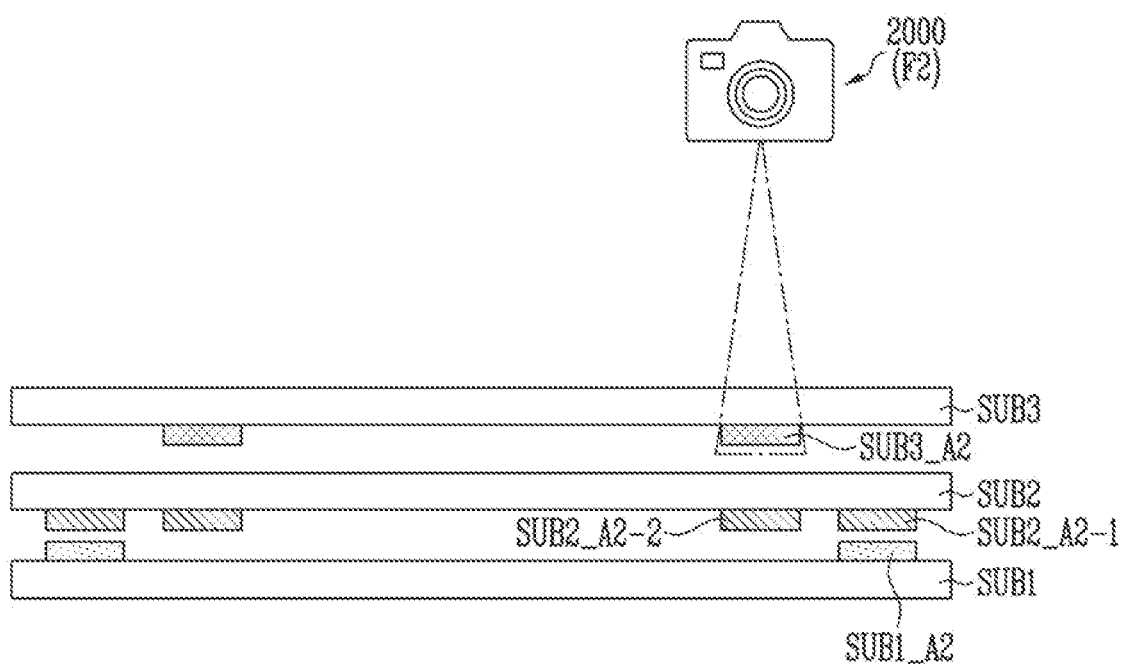
FIG. 20 illustrates an example in which a camera device photographs a second alignment mark of a third substrate.

FIG. 17 illustrates an example of a second alignment mark according to the method of manufacturing the display device of FIG. 16, FIG. 18 illustrates an example in which a camera device photographs a second alignment mark of a first substrate and a (2-1)-th alignment mark of a second substrate, FIG. 19 illustrates an example in which a camera device photographs a (2-2)-th alignment mark of a second substrate, and FIG. 20 illustrates an example in which a camera device photographs a second alignment mark of a third substrate.

For ease of comprehension and description, FIG. 17 to FIG. 20 show a case in which a second alignment mark SUB1_A2 of the first substrate SUB1 and a (2-1)-th alignment mark SUB2_A2-1 of the second substrate overlap and a (2-2)-th alignment mark SUB2_A2-2 of the second substrate SUB2 and a second alignment mark SUB3_A2 of the third substrate SUB3 overlap. The (2-1)-th alignment mark SUB2_A2-1 and (2-2)-th alignment mark SUB2_A2-2 are collectively referred to as the second alignment mark of the second substrate SUB2. It is to be understood, however, that in other embodiments some or all or these alignment marks may not overlap.

Referring to FIG. 17, the second alignment mark SUB1_A2 of the first substrate SUB1 and the (2-1)-th alignment mark SUB2_A2-1 of the second substrate SUB2 may be formed at the same position. In particular, the second alignment mark SUB1_A2 of the first substrate SUB1 and the (2-1)-th alignment mark SUB2_A2-1 of the second substrate SUB2 may be in close proximity to each other. The second alignment mark SUB2_A2-2 of the second substrate SUB2 and the second alignment mark SUB3_A2 of the third substrate SUB3 may be formed at the same position. For example, the (2-1)-th alignment mark SUB2_A2-1 of the second substrate SUB2 may be used to align the second alignment mark SUB1_A2 of the first substrate SUB1, and the (2-2)-th alignment mark SUB2_A2-2 of the second substrate SUB2 may be used to align the second alignment mark SUB3_A2 of the third substrate SUB3.

The second alignment mark SUB1_A2 of the first substrate SUB1 may be formed on an upper portion of the first substrate SUB1. The (2-1)-th alignment mark SUB2_A2-1 and (2-2)-th alignment mark SUB2_A2-2 of the second substrate SUB2 may be formed on a lower portion of the second substrate SUB2. The second alignment mark SUB3_A2 of the third substrate SUB3 may be formed on a lower portion of the third substrate SUB3. For example, the (2-1)-th alignment mark SUB2_A2-1 and (2-2)-th alignment mark SUB2_A2-2 of the second substrate SUB2 may be formed through the same photoresist process.

As described above, the method of manufacturing the display device may form the second substrate SUB2 in a more accurate position by forming the second alignment mark SUB1_A2 of the first substrate SUB1 and the (2-1)-th alignment mark SUB2_A2-1 of the second substrate SUB2 as close as possible.

However, the present disclosure is not limited thereto. For example, the second alignment mark SUB1_A2 of the first substrate SUB1 may be formed on a lower portion of the first substrate SUB1. For example, the (2-1)-th alignment mark SUB2_A2-1 and (2-2)-th alignment mark SUB2_A2-2 of the second substrate SUB2 may be formed on an upper portion of the second substrate SUB2. For example, the (2-1)-th alignment mark SUB2_A2-1 of the second substrate SUB2 may be formed on a lower portion of second substrate SUB2, and the (2-2)-th alignment mark SUB2_A2-2 of the second substrate SUB2 may be formed on an upper portion of the second substrate SUB2. For example, the second alignment mark SUB3_A2 of the third substrate SUB3 may be formed on an upper portion of the third substrate SUB3.

Referring to FIG. 18 to FIG. 20, the method of manufacturing the display device may check whether the second alignment marks SUB1_A2, SUB2_A2-1, SUB2_A2-2, and SUB3_A2 are aligned through the camera device 2000.

In the manufacturing method of the display device, the second alignment mark SUB1_A2 of the first substrate SUB1 and the (2-1)-th alignment mark SUB2_A2-1 of the second substrate SUB2 may photographed with the camera device 2000, and the second substrate SUB2 may be moved to align the (2-1)-th alignment mark SUB2_A2-1 of the second substrate SUB2 with the second alignment mark SUB1_A2 of the first substrate SUB1, as shown in FIG. 18. In the manufacturing method of the display device, the (2-2)-th alignment mark SUB2_A2-2 of the second substrate SUB2 and the second alignment mark SUB3_A2 of the third substrate SUB3 may photographed with the camera device 2000, and the third substrate SUB3 may be moved to align the second alignment mark SUB3_A2 of the third substrate SUB3 with the (2-2)-th alignment mark SUB2_A2-2 of the second substrate SUB2, as shown in FIGS. 19 and 20.

For example, the second alignment mark SUB1_A2 of the first substrate SUB1, the (2-1)-th alignment mark SUB2_A2-1 of the second substrate SUB2, and the (2-2)-th alignment mark SUB2_A2-2 of the second substrate SUB2 may be photographed with the camera device 2000 set to the first focus F1. For example, the second alignment mark SUB3_A2 of the third substrate SUB3 may be photographed with the camera device 2000 set to the second focus F2 that is different from the first focus F1.

Figure 21:
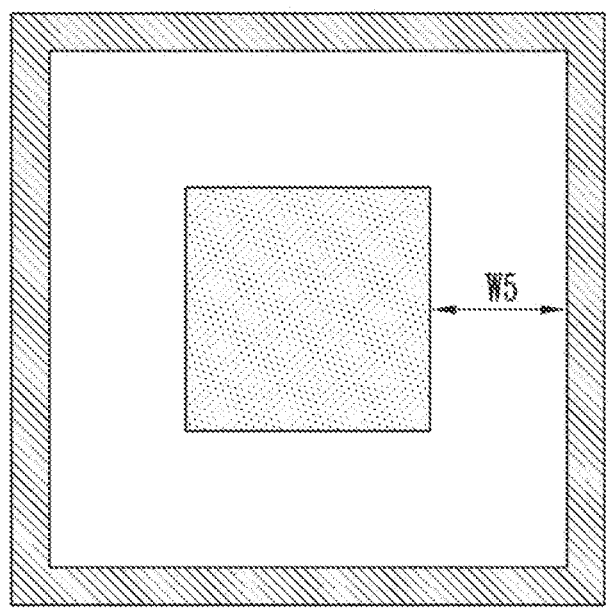
FIG. 21 and FIG. 22 illustrate examples of aligning the second alignment mark of the first substrate and the (2-1)-th alignment mark of the second substrate in FIG. 17.
Figure 22:
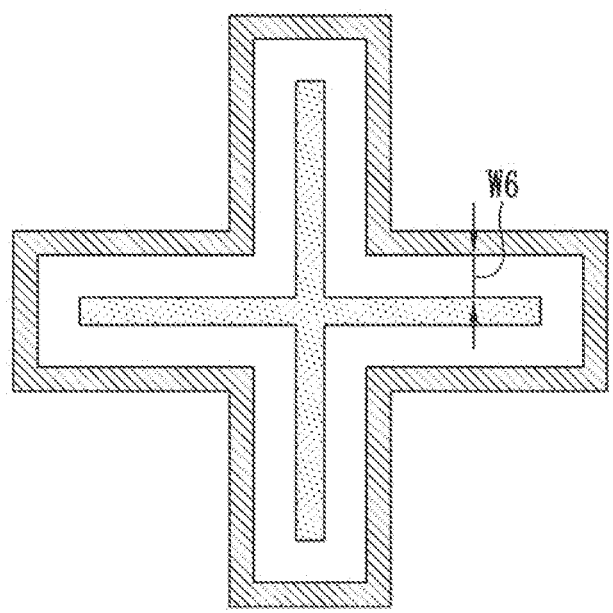
Figure 23:
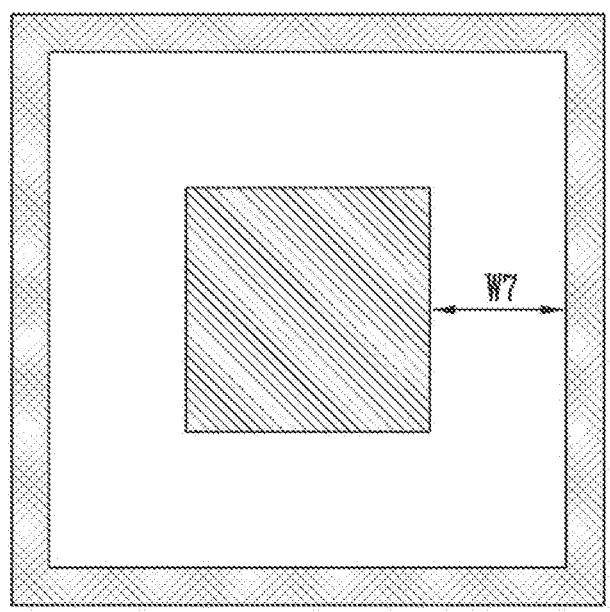
FIG. 23 and FIG. 24 illustrate examples of aligning the (2-2)-th alignment mark of the second substrate and the second alignment mark of the third substrate in FIG. 17.
Figure 24:
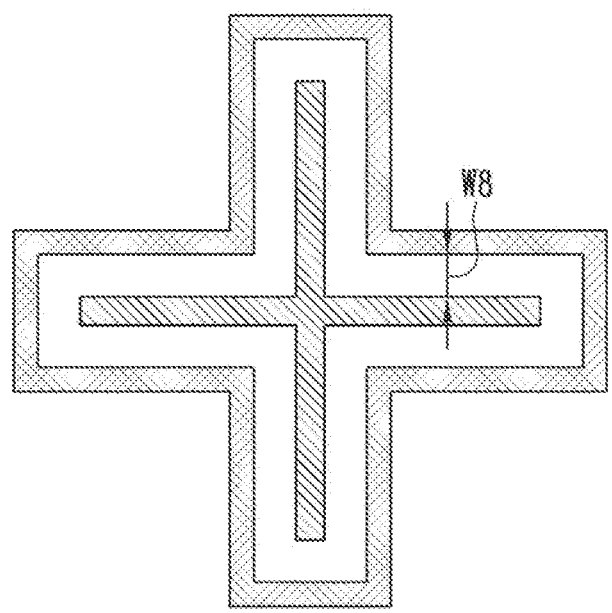

FIG. 21 and FIG. 22 illustrate examples of aligning the second alignment mark of the first substrate and the (2-1)-th alignment mark of the second substrate in FIG. 17, and FIG. 23 and FIG. 24 illustrate examples of aligning the (2-2)-th alignment mark of the second substrate and the second alignment mark of the third substrate in FIG. 17.

Referring to FIG. 21 to FIG. 24, the alignment of the alignment marks may be determined in a preset manner.

In the embodiment, according to the method of manufacturing the display device, the second alignment mark SUB1_A2 of the first substrate SUB1 may be included in the (2-1)-th alignment mark SUB2_A2-1 of the second substrate SUB2, so that the (2-1)-th alignment mark SUB2_A2-1 of the second substrate SUB2 may be aligned to the second alignment mark SUB1_A2 of the first substrate SUB1.

For example, as shown in FIG. 21, the second alignment mark SUB1_A2 of the first substrate SUB1 and the (2-1)-th alignment mark SUB2_A2-1 of the second substrate SUB2 may have a quadrangular shape. In FIG. 21, the second alignment mark SUB1_A2 of the first substrate SUB1 may be surrounded by the (2-1)-th alignment mark SUB2_A2-1 of the second substrate SUB2. For example, as shown in FIG. 22, the second alignment mark SUB1_A2 of the first substrate SUB1 and the (2-1)-th alignment mark SUB2_A2-1 of the second substrate SUB2 may have a cross shape. In FIG. 22, the second alignment mark SUB1_A2 of the first substrate SUB1 may be surrounded by the (2-1)-th alignment mark SUB2_A2-1 of the second substrate SUB2.

A maximum width (e.g., a sixth width W6) that may be formed when the second alignment mark SUB1_A2 of the first substrate SUB1 and the (2-1)-th alignment mark SUB2_A2-1 of the second substrate SUB2 in FIG. 22 are aligned may be smaller than a maximum width (e.g., a fifth width W5) that may be formed when the second alignment mark SUB1_A2 of the first substrate SUB1 and the (2-1)-th alignment mark SUB2_A2-1 of the second substrate SUB2 in FIG. 21 are aligned. Thus, for example, the alignment according to FIG. 21 may have a larger margin for alignment than the alignment according to FIG. 22. Accordingly, the tolerance for the alignment of the second alignment mark SUB1_A2 of the first substrate SUB1 and the (2-1)-th alignment mark SUB2_A2-1 of the second substrate SUB2 according to FIG. 21 may be greater than the tolerance for the alignment of the second alignment mark SUB1_A2 of the first substrate SUB1 and the (2-1)-th alignment mark SUB2_A2-1 of the second substrate SUB2 according to FIG. 22. Accordingly, the alignment according to FIG. 22 may be more suitable for fine adjustment than the alignment according to FIG. 21.

In the embodiment, according to the method of manufacturing the display device, the (2-2)-th alignment mark SUB2_A2-2 of the second substrate SUB2 may be included in the second alignment mark SUB3_A2 of the third substrate SUB3, so that the second alignment mark SUB3_A2 of the third substrate SUB3 may be aligned to the (2-2)-th alignment mark SUB2_A2-2 of the second substrate SUB2.

For example, as shown in FIG. 23, the (2-2)-th alignment mark SUB2_A2-2 of the second substrate SUB2 and the second alignment mark SUB3_A2 of the third substrate SUB3 may have a quadrangular shape. In FIG. 23, the (2-2)-th alignment mark SUB2_A2-2 of the second substrate SUB2 may be surrounded by the second alignment mark SUB3_A2 of the third substrate SUB3. For example, as shown in FIG. 24, the (2-2)-th alignment mark SUB2_A2-2 of the second substrate SUB2 and the second alignment mark SUB3_A2 of the third substrate SUB3 may have a cross shape. In FIG. 24, the (2-2)-th alignment mark SUB2_A2-2 of the second substrate SUB2 may be surrounded by the second alignment mark SUB3_A2 of the third substrate SUB3.

A maximum width (e.g., an eighth width W8) that may be formed when the (2-2)-th alignment mark SUB2_A2-2 of the second substrate SUB2 and the second alignment mark SUB3_A2 of the third substrate SUB3 in FIG. 24 are aligned may be smaller than a maximum width (e.g., a seventh width W7) that may be formed when the (2-2)-th alignment mark SUB2_A2-2 of the second substrate SUB2 and the second alignment mark SUB3_A2 of the third substrate SUB3 in FIG. 23 are aligned. Thus, for example, the alignment according to FIG. 23 may have a larger margin for alignment than the alignment according to FIG. 24. Accordingly, the tolerance for the alignment of the (2-2)-th alignment mark SUB2_A2-2 of the second substrate SUB2 and the second alignment mark SUB3_A2 of the third substrate SUB3 according to FIG. 23 may be greater than the tolerance for the alignment of the (2-2)-th alignment mark SUB2_A2-2 of the second substrate SUB2 and the second alignment mark SUB3_A2 of the third substrate SUB3 according to FIG. 24. Accordingly, the alignment according to FIG. 24 may be more suitable for fine adjustment than the alignment according to FIG. 23.

However, the present disclosure is not limited to the shape and alignment method of the alignment mark.

Figure 25:
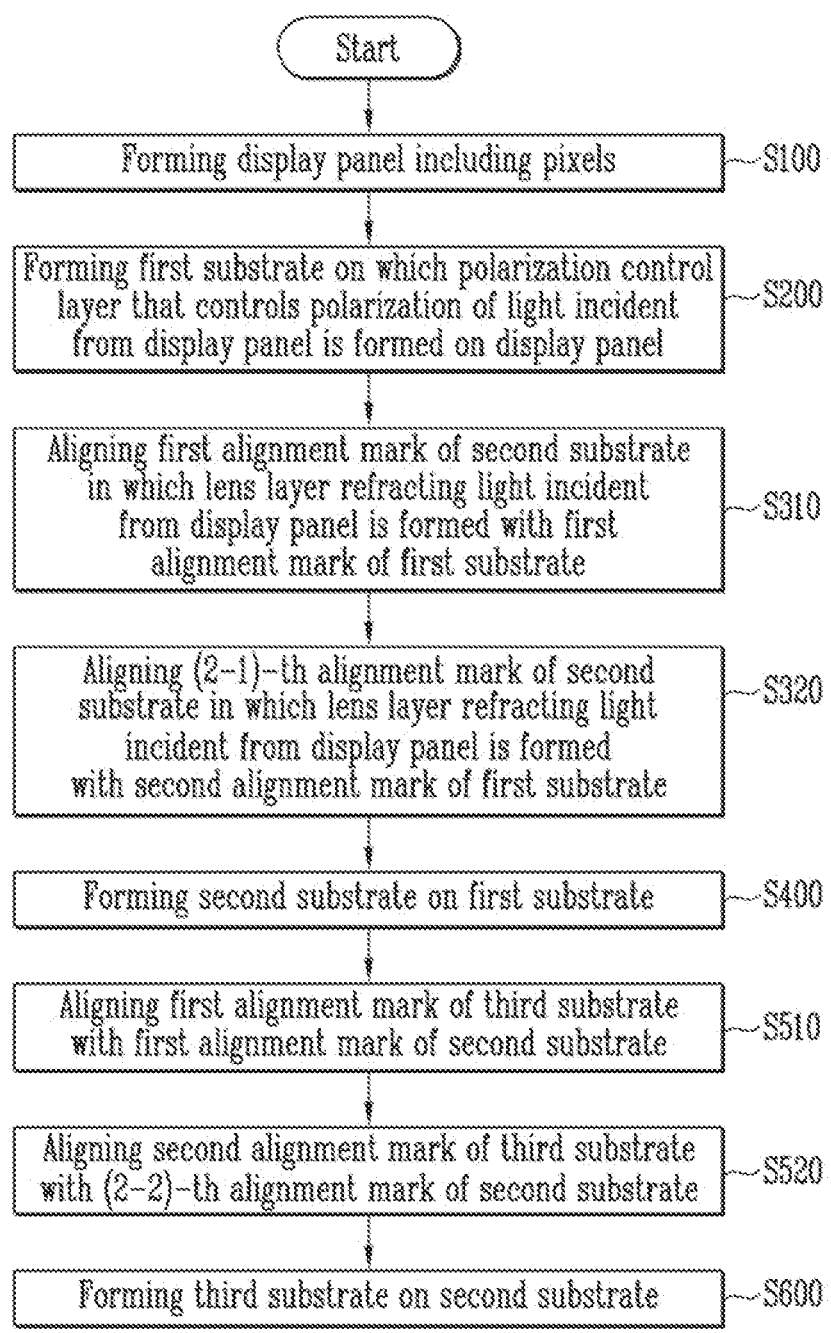
FIG. 25 illustrates a flowchart of a method of manufacturing a display device according to embodiments of the present disclosure.
Figure 26:
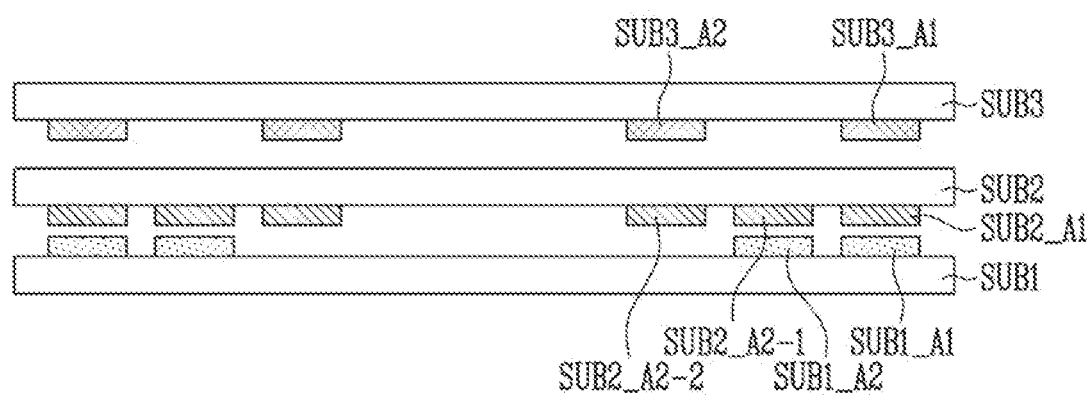
FIG. 26 illustrates an example of an alignment mark according to the method of manufacturing the display device of FIG. 25.

FIG. 25 illustrates a flowchart of a method of manufacturing a display device according to embodiments of the present disclosure, and FIG. 26 illustrates an example of an alignment mark according to the method of manufacturing the display device of FIG. 25.

Since the method of manufacturing the display device according to the present embodiment is substantially the same as the method of manufacturing the display device of FIG. 1, except for including both the first alignment mark in FIG. 5 and the second alignment mark in FIG. 17, the same reference numerals and reference symbols are used for the same or similar constituent elements, and redundant descriptions are omitted.

Referring to FIG. 25, the method of manufacturing the display device in FIG. 25 may include forming a display panel including pixels (S100), forming a first substrate on which a polarization control layer that controls polarization of light incident from the display panel is formed on the display panel (S200), aligning a first alignment mark of a second substrate in which a lens layer refracting light incident from the display panel is formed with a first alignment mark of a first substrate (S310), aligning a (2-1)-th alignment mark of the second substrate in which a lens layer refracting light incident from the display panel is formed with a second alignment mark of the first substrate (S320), forming the second substrate on the first substrate (S400), aligning a first alignment mark of a third substrate with the first alignment mark of the second substrate (S510), aligning a second alignment mark of a third substrate with a (2-2)-th alignment mark of the second substrate (S520), and forming the third substrate on the second substrate (S600).

Referring to FIG. 26, the tolerance for the alignment of the first alignment mark SUB1_A1 of the first substrate SUB1 and the first alignment mark SUB2_A1 of the second substrate SUB2 may be greater than the tolerance for the alignment of the second alignment mark SUB1_A2 of the first substrate SUB1 and the (2-1)-th alignment mark SUB2_A2-1 of the second substrate SUB2. For example, as shown in FIG. 9 and FIG. 22, the first alignment mark SUB1_A1 of the first substrate SUB1 and the first alignment mark SUB2_A1 of the second substrate SUB2 may have a quadrangular shape, and the second alignment mark SUB1_A2 of the first substrate SUB1 and the (2-1)-th alignment mark SUB2_A2-1 of the second substrate SUB2 may have a cross shape.

The tolerance for the alignment of the first alignment mark SUB2_A1 of the second substrate SUB2 and the first alignment mark SUB3_A1 of the third substrate SUB3 may be greater than the tolerance for the alignment of the (2-2)-th alignment mark SUB2_A2-2 of the second substrate SUB2 and the second alignment mark SUB3_A2 of the third substrate SUB3. For example, as shown in FIG. 11 and FIG. 24, the first alignment mark SUB2_A1 of the second substrate SUB2 and the first alignment mark SUB3_A1 of the third substrate SUB3 may have a quadrangular shape, and the (2-2)-th alignment mark SUB2_A2-2 of the second substrate SUB2 and the second alignment mark SUB3_A2 of the third substrate SUB3 may have a cross shape.

According to the method of manufacturing the display device of FIG. 25, after roughly moving the first, second and third substrates SUB1, SUB2, and SUB3 using the first alignment marks SUB1_A1, SUB2_A1, and SUB3_A1, the positions of the first, second and third substrates SUB1, SUB2, and SUB3 may be finely adjusted using the second alignment marks SUB1_A2, SUB2_A2-1, SUB2_A2-2, and SUB3_A2.

The present disclosure may be applied to a display device and an electronic device including the same. For example, the present disclosure may be applied to a digital TV, a 3D TV, a mobile phone, a smart phone, a tablet computer, a virtual reality (VR) device, a personal computer (PC), a home electronic device, a laptop computer, a personal digital assistant (PDA), a portable multimedia player (PMP), a digital camera, a music player, a portable game console, a navigation device, and the like.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. A method of manufacturing a display device, comprising:
    forming a display panel including pixels;
    forming a first substrate on the display panel, wherein a polarization control layer is to be formed on the first substrate;
    aligning a first alignment mark of a second substrate with a first alignment mark of the first substrate, wherein a lens layer is to be formed on the second substrate;
    forming the second substrate on the first substrate;
    aligning a first alignment mark of a third substrate with the first alignment mark of the second substrate; and
    forming the third substrate on the second substrate.

2. The method of manufacturing the display device of claim 1, wherein
    the first alignment mark of the first substrate is formed on an upper portion of the first substrate.

3. The method of manufacturing the display device of claim 1, wherein
    the first alignment mark of the second substrate is formed on a lower portion of the second substrate.

4. The method of manufacturing the display device of claim 1, wherein
    the first alignment mark of the third substrate is formed on a lower portion of the third substrate.

5. The method of manufacturing the display device of claim 1, wherein
    the aligning of the first alignment mark of the second substrate with the first alignment mark of the first substrate includes
    photographing the first alignment mark of the first substrate and the first alignment mark of the second substrate with a camera; and
    aligning the first alignment mark of the second substrate with the first alignment mark of the first substrate by moving the second substrate based on the photograph.

6. The method of manufacturing the display device of claim 1, wherein
    the aligning of the first alignment mark of the third substrate with the first alignment mark of the second substrate includes
    photographing the first alignment mark of the second substrate with a camera set to a first focus;
    photographing the first alignment mark of the third substrate with the camera set to a second focus different from the first focus; and
    aligning the first alignment mark of the third substrate with the first alignment mark of the second substrate by moving the third substrate based on the photographs.

7. The method of manufacturing the display device of claim 1, wherein
    the first alignment mark of the first substrate, the first alignment mark of the second substrate, and the first alignment mark of the third substrate are formed in a scribe line area.

8. The method of manufacturing the display device of claim 1, wherein
    the first alignment mark of the first substrate, the first alignment mark of the second substrate, and the first alignment mark of the third substrate are formed in an active area.

9. The method of manufacturing the display device of claim 1, wherein
    the first alignment mark of the first substrate, the first alignment mark of the second substrate, and the first alignment mark of the third substrate are formed in a scribe line area and an active area.

10. The method of manufacturing the display device of claim 1, further comprising
    aligning a (2-1)-th alignment mark of the second substrate with a second alignment mark of the first substrate.

11. The method of manufacturing the display device of claim 10, wherein
    a tolerance for the aligning of the first alignment mark of the first substrate and the first alignment mark of the second substrate is greater than a tolerance for the aligning of the second alignment mark of the first substrate and the (2-1)-th alignment mark of the second substrate.

12. The method of manufacturing the display device of claim 10, further comprising
    aligning a second alignment mark of the third substrate with a (2-2)-th alignment mark of the second substrate that is spaced apart from the (2-1)-th alignment mark of the second substrate.

13. The method of manufacturing the display device of claim 12, wherein
    a tolerance for the aligning of the first alignment mark of the second substrate and the first alignment mark of the third substrate is greater than a tolerance for the aligning of the (2-2)-th alignment mark of the second substrate and the second alignment mark of the third substrate.

14. A method of manufacturing a display device, comprising:
    forming a display panel including pixels;
    forming a first substrate on the display panel, wherein a polarization control layer is to be formed on the first substrate;
    aligning a (2-1)-th alignment mark of a second substrate with a second alignment mark of the first substrate, wherein a lens layer is to be formed on the second substrate;
    forming the second substrate on the first substrate;
    aligning a second alignment mark of a third substrate with a (2-2)-th alignment mark of the second substrate that is spaced apart from the (2-1)-th alignment mark of the second substrate; and
    forming the third substrate on the second substrate.

15. The method of manufacturing the display device of claim 14, wherein
    the second alignment mark of the first substrate is formed on an upper portion of the first substrate,
    the (2-1)-th alignment mark and the (2-2)-th alignment mark of the second substrate are formed on a lower portion of the second substrate, and
    the second alignment mark of the third substrate is formed on a lower portion of the third substrate.

16. The method of manufacturing the display device of claim 14, wherein
    the aligning of the (2-1)-th alignment mark of the second substrate with the second alignment mark of the first substrate includes photographing the second alignment mark of the first substrate and the (2-1)-th alignment mark of the second substrate with a camera; and aligning the (2-1)-th alignment mark of the second substrate with the second alignment mark of the first substrate by moving the second substrate based on the photograph.

17. The method of manufacturing the display device of claim 14, wherein the aligning of the second alignment mark of the third substrate with the (2-2)-th alignment mark of the second substrate includes photographing the (2-2)-th alignment mark of the second substrate with a camera set to a first focus;

photographing the second alignment mark of the third substrate with the camera set to a second focus different from the first focus; and aligning the second alignment mark of the third substrate with the (2-2)-th alignment mark of the second substrate by moving the third substrate based on the photographs.

18. The method of manufacturing the display device of claim 14, wherein the second alignment mark of the first substrate, the (2-1)-th alignment mark of the second substrate, the (2-2)-th alignment mark of the second substrate, and the second alignment mark of the third substrate are formed in a scribe line area.

19. The method of manufacturing the display device of claim 14, wherein the second alignment mark of the first substrate, the (2-1)-th alignment mark of the second substrate, the (2-2)-th alignment mark of the second substrate, and the second alignment mark of the third substrate are formed in an active area.

20. The method of manufacturing the display device of claim 14, wherein the second alignment mark of the first substrate, the (2-1)-th alignment mark of the second substrate, the (2-2)-th alignment mark of the second substrate, and the second alignment mark of the third substrate are formed in a scribe line area and an active area.

* * * * *